(12) United States Patent
Skadhauge et al.

(10) Patent No.: US 12,031,114 B2
(45) Date of Patent: *Jul. 9, 2024

(54) REFINED CEREAL-BASED BEVERAGES

(71) Applicant: Carlsberg Breweries A/S, Copenhagen V (DK)

(72) Inventors: Birgitte Skadhauge, Birkerod (DK); Finn Lok, Valby (DK); Søren Knudsen, Malov (DK); Toni Wendt, Frederiksberg (DK); Katarzyna Krucewicz, Soborg (DK); Lucia Marri, Frederiksberg (DK); Ole Olsen, Copenhagen S (DK)

(73) Assignee: Carlsberg Breweries A/S, Copenhagen V (DK)

( * ) Notice: Subject to any disclaimer, the term of this patent is extended or adjusted under 35 U.S.C. 154(b) by 11 days.

This patent is subject to a terminal disclaimer.

(21) Appl. No.: 17/828,247

(22) Filed: May 31, 2022

(65) Prior Publication Data
US 2022/0389353 A1    Dec. 8, 2022

Related U.S. Application Data

(63) Continuation of application No. 16/311,348, filed as application No. PCT/EP2017/065498 on Jun. 23, 2017, now Pat. No. 11,384,322.

(30) Foreign Application Priority Data

Jul. 1, 2016  (EP) ..................................... 16177402

(51) Int. Cl.
| | | |
|---|---|---|
| C12C 1/047 | (2006.01) | |
| C12C 1/02 | (2006.01) | |
| C12C 7/047 | (2006.01) | |

(52) U.S. Cl.
CPC ................ *C12C 1/047* (2013.01); *C12C 1/02* (2013.01); *C12C 7/047* (2013.01)

(58) Field of Classification Search
CPC ........... C12C 7/047; C12C 1/047; C12C 1/02; C12C 1/027
See application file for complete search history.

(56) References Cited

U.S. PATENT DOCUMENTS

| | | |
|---|---|---|
| 3,647,473 A | 3/1972 | Stowell et al. |
| 4,052,795 A | 10/1977 | Pollock et al. |

(Continued)

FOREIGN PATENT DOCUMENTS

| | | |
|---|---|---|
| CO | 20200007640 | 6/2020 |
| EP | 1952702 A4 | 8/2009 |

(Continued)

OTHER PUBLICATIONS

Briggs, Malts and Malting, First Ed., Blackie & Professionals, London, ISBN0 412 29800, 1998, p. 695.

(Continued)

*Primary Examiner* — Vera Stulii
(74) *Attorney, Agent, or Firm* — McNeill Baur PLLC

(57) ABSTRACT

The present invention relates to methods for preparing cereal-based beverages. Particularly, the present invention provides, for example, methods for steeping and germination of cereal grain under continuous aeration. The present invention also provides for wet milling of germinated cereal grains and direct transfer of the germinated grain, without drying, to the brewery for further processing. Compared to current methods the methods of the present invention significantly reduces water consumption, energy consumption and transport need.

20 Claims, 18 Drawing Sheets

(56) References Cited

U.S. PATENT DOCUMENTS

| | | | |
|---|---|---|---|
| 4,315,380 | A | 2/1982 | Davidson |
| 9,326,542 | B2 | 5/2016 | Kondo et al. |
| 2011/0293779 | A1 | 12/2011 | Knudsen et al. |
| 2013/0095207 | A1 | 4/2013 | Knudsen et al. |

FOREIGN PATENT DOCUMENTS

| | | | | |
|---|---|---|---|---|
| EP | 2258821 | A2 | 12/2010 | |
| EP | 3017706 | A1 | 5/2016 | |
| FR | 2462085 | A1 | 2/1981 | |
| GB | 962302 | A | 7/1964 | |
| GB | 1044029 | A | 9/1966 | |
| GB | 1121394 | A | 7/1968 | |
| GB | 1492438 | A | 11/1977 | |
| GB | 2194795 | A | 3/1988 | |
| JP | 5685202 | B2 | 3/2015 | |
| SU | 1211283 | A1 | 2/1986 | |
| UA | 7653 | U | 7/2005 | |
| UA | 88341 | C2 | 10/2009 | |
| UA | 63292 | U | 10/2011 | |
| UA | 102571 | U | 11/2015 | |
| WO | 8606740 | A1 | 11/1986 | |
| WO | 03048294 | A1 | 6/2003 | |
| WO | 2006133496 | A1 | 12/2006 | |
| WO | WO-2010063288 | A2 * | 6/2010 | ............. C12C 1/073 |
| WO | 2013163041 | A1 | 10/2013 | |
| WO | 2019129724 | A1 | 7/2019 | |
| WO | 2019129731 | A1 | 7/2019 | |

OTHER PUBLICATIONS

Cereal Bases & Malt Bases for Food & Beverages—Döhler, https://www.doehler.com, Printed Feb. 12, 2020.

English translation of the Office Action dated Dec. 21, 2020 for Japanese Patent Application No. 2018-567659 issued by the Japanese Patent Office (4 pages).

Fernandes Cheryl G., et al., Cereal based functional beverages: A review, J Microbiol Biotech Food Sci, 8 (3), p. 914-919, 2018/19.

Fincher, Biochemistry, Physiology and Genetics of Endosperm Mobilization in Germinated Barley Grain In: Barley: Production, Improvements and Uses. Ed Ullrich SE, Wiley-Blackwell, Chapter 14, p. 449-477, 2011.

https://en.wikipedia.org/wiki/Malting; page dated Aug. 7, 2011; relevant edit date Jan. 11, 2014 according to wikipedia Xtools (date_Jun. 22, 2016) (Category: A).

https://en.wikipedia.org/wiki/Malting; page dated Aug. 7, 2011; relevant edit date Jun. 22, 2016 according to wikipedia Xtools (Category: A).

https://onlinelibrary.wiley.com/doi/pdf/10.1002/j.2050-0416.1963.tb01925.x Duff et al Use of Green Malt in Brewing (Year: 1963).

Kelley, et al., "Barley Maturity and the Effects of Steep Aeration on Malting," J. Inst. Brew., vol. 98, pp. 329-334 (1992).

Smith et al., Starch Degradation. Annual Review of Plant Biology 56: 73-98, 2005.

Translation of JP 56-085202, 1981.

Wunderlich and Back, "Beer in Health and Disease Prevention, 1—Overview of Manufacturing Beer: Ingredients, Processes, and Quality Criteria", Beer in Health and Disease Prevention, Academic Press, p. 3-16 (2009).

* cited by examiner

REFINED CEREAL-BASED BEVERAGES

CROSS-REFERENCE TO RELATED APPLICATIONS

This application is a continuation of U.S. application Ser. No. 16/311,348, filed on Dec. 19, 2018, which is a national phase entry pursuant to 35 U.S.C. § 371 of International Application No. PCT/EP2017/065498, filed Jun. 23, 2017, which claims the benefit of priority of European Application No. 16177402.1, filed Jul. 1, 2016, each of which is incorporated by reference herein in its entirety for any purpose.

FIELD OF THE INVENTION

The present invention relates, generally, to germination and preparation of aqueous extracts of cereals (e.g. prepared through mashing), including processes used to produce beer. The invention thus provides a low-input, rapid and continuous process to prepare beer from barley grain. The methods may be performed in a single facility. The instant invention is equally applicable to the germination and preparation of aqueous extracts of other cereal grains—including rice, sorghum, maize, millet and wheat—as well as brewing processes comprising adjuncts.

BACKGROUND OF THE INVENTION

In commercial malting processes, barley grains are germinated, or malted, under controlled conditions that allow partial mobilization of the starch and protein reserves of the starchy endosperm over a period of 4-6 d. The malting process is typically initiated by immersing the dry barley grain in water. This process is known as steeping where the objective is not only to clean the grain, but also to raise its moisture content to about 40% (w/w) so that the endosperm mobilization step that follows will occur more quickly. During steeping, the water is drained once to allow re-aeration of the grain. This step is known as the 'air rest' and is considered necessary, primarily because the submerged grain becomes starved of oxygen after about 16 h. After an 'air rest' of about 8 h, the grain is re-immersed in water to complete the steeping treatment over another 8-h period—or in a series of re-steeping steps. The two-step steeping process to increase the moisture content of the dry grain to 40%, or higher, takes about 32 h overall. In some malthouses, spray steeping techniques are used.

The steeped grain is spread for germination, during which enzymes secreted from aleurone and scutellar epithelial cells—together with some that pre-exist in the starchy endosperm cells—degrade cell walls, starch and protein. Under normal conditions of germination, the phytohormone gibberellic acid (GA) is believed to be synthesized in the nodal region, or elsewhere in the embryo, from where it diffuses along the water gradient (Fincher, 2011).

The maltster usually aims to rapidly induce synthesis of as many of the starch-degrading enzymes in the grains as possible. In many commercial malting programs, GA is added to speed up the process of enzyme secretion from the aleurone layer. The starch-degrading enzymes—which include α- and β-amylases, starch debranching enzymes and α-glucosidases—partially depolymerize the starch reserves of the grain to monosaccharides, oligosaccharides, and glucose (Smith et al., 2005; regarding said β-amylases, it is notable that these are deposited in the starchy endosperm during grain development). The depolymerization products of starch are subsequently used by yeast cells as a carbon source and are fermented into beer ethanol. Diastatic power is a malting quality parameter that refers to activity levels of the battery of starch degrading enzymes, with high values desirable for brewing.

Other major components of the barley grain include storage proteins, which are also found in the dead starchy endosperm cells and include hordeins as well as water and salt soluble proteins. Depolymerization of these also begins naturally in the malting process, but the brewer may manage the degree of degradation of these proteins so that sufficient peptides and amino acids are released to support yeast growth during the subsequent germination step in the brewery. However, if degradation of storage proteins proceed too much, the released proteins can cause difficulties in the brewing process. In particular, high levels of released soluble protein can precipitate and form undesirable haze in the final beer product or increase potential for Strecker aldehyde formation during storage of beer. In specifications of malting quality, an adequate level of free amino nitrogen (FAN) is desirable for yeast growth during fermentation. The Kolbach Index is a measure of the soluble:total protein ratio, with malt giving rise to an adequate Kolbach index generally preferred. The extent of protein degradation is therefore an ongoing challenge for the maltster. In addition to the beer precipitation problem that can be associated with excessive extracted proteins, very high FAN levels can also lead to difficulties, through the potential for off-flavour formation.

Maltsters also try to induce high levels of enzymes that degrade cell wall polysaccharides in the barley grain, in particular the (1,3;1,4)-β-glucans and arabinoxylans. Incompletely degraded (1,3;1,4)-β-glucans can be especially troublesome for brewers, because these can be extracted from the malt in soluble forms that form highly viscous aqueous solutions that slow filtration processes in the brewery and contribute to undesirable haze in the final beer. Thus, low levels of soluble (1,3;1,4)-β-glucan represent an important malting quality parameter, while high levels of (1,3;1,4)β-glucanase enzymes remain important measures of malt quality.

As noted above, the malting process typically takes about 4-to-5 d. Following the controlled germination steps, the wet malt is dried from about a moisture content of 40% to 4-to-5%. This drying process, termed kilning, is very energy consuming and represents a major cost for the industry.

The kiln-drying has been considered an important part of beer production for multiple reasons. One important reason is that during germination rootlets (also referred to as "culms") are formed. The rootlets have a bitter taste, which affects the aftertaste of beer, and furthermore, the rootlets may add undesirable color to beer (see Beer Brewing Technology (1999): 183, published by Shokuhin Sangyo Shimbun as well as U.S. Pat. No. 9,326,542). Once green malt has been kiln drying the rootlets can easily be removed e.g. using a deculmer. According to the general textbook on "Malts and Malting" by D. E. Briggs then "culms must be removed [ . . . ] since they are extremely hydroscopic, rich in soluble nitrogenous substances, contain poorly flavoured and bitter substances and can be rich in sulphur dioxide and/or nitrosamines. Deculming should be carried out soon after the malt is stripped from the kiln to help cool it and before the rootlets pick up moisture from the air, become slack and pliable (less brittle) and therefore, more difficult to break and separate" (D. E. Briggs, Malts and Malting; p 695 First Edition, 1998 Published by Blackie & Professionals, London, ISBN0 412 29800).

Kiln-dried malt generally has a moisture level of 4.5-5.0%. The kiln-dried malt is subsequently transported from the malthouse to the brewery by road, rail or sea. This relates to the fact that processes of malting and brewing have traditionally been undertaken at different locations and often by different corporate entities.

In the brewery, the kiln-dried malt is milled to break open the grain, and the resulting content is extracted with hot water in a process known as mashing. The extracted material includes partially degraded starch, protein and cell wall molecules as described above, and these are further degraded by endogenous grain enzymes that were extracted from the malt. At this stage, some brewers add additional—and generally cheaper carbon sources (adjuncts)—to support the subsequent yeast fermentation process and to offset the higher costs of malt. Said adjuncts can be barley, rice, wheat or other cereal flours from un-germinated grain, but their addition may necessitate the concomitant addition of hydrolytic enzymes, because there are insufficient endogenous enzymes in the malt to degrade the components of the adjunct. The added enzymes are usually from unpurified and relatively cheap extracts of fungal and/or bacterial cultures. The addition of exogenous enzymes is not legal in some countries, particularly where beer must be produced under tightly regulated settings.

Further degradation of the starch, and other endosperm components extracted in hot water, proceed in a process known as saccharification. Following mashing, the extracts are filtered, often in a lauter tun, and cooled. The extract may be boiled in the presence of hops or hop extracts, and upon cooling yeast cultures are added for the fermentation of released sugars to ethanol. The beer so produced is usually matured and filtered before bottling. The beer may also be carbonated prior to bottling.

SUMMARY OF THE INVENTION

The instant invention provides methods for fast germination and preparation of aqueous extracts of cereals. The methods significantly speed up the process of preparing wort for production of cereal-based beverages, while maintaining the potential for preparing said wort with high levels of fermentable sugars, preferably with low levels of β-glucan and xylan. In particular, the beverages prepared from said wort may be characterized by a low level of astringent taste.

The invention demonstrates that a continuous and integrated brewing process going from dry barley grain to beer can be undertaken at a single location. In that respect, the present invention provides methods for combined steeping and germination of cereal grain to a moisture content of for example >30%, preferably >35% through constant aeration. The invention may thereby provide for significant water savings through the elimination of drying of the malt as well as significant energy savings e.g. by omission of the kiln drying step.

In the present invention, the grains are submerged and incubated in an aqueous solution (typically water), wherein $O_2$ is supplied to said liquid. Typically, said $O_2$ is supplied continuously throughout the incubation, which for example may be for in the range of 20 to 72 h and in general allow the grain not only to reach the appropriate moisture content but also to germinate in a controlled manner. The step of germination may also comprise one or more air-rests typically following the step incubation in aqueous solution under aeration. This controlled germination process may be shortened by the addition of one or more compound capable of accelerating the germination. For example, the phytohormone gibberellic acid (GA) may be added to the aqueous liquid—either from the onset or during incubation. GA 'activates' gene expression in its target cells, namely the aleurone and the scutellar epithelium of the barley grain, including genes encoding endogenous enzymes necessary for the hydrolysis of starch, storage proteins and cell wall polysaccharides. Thus, the total time required for steeping and germination may be reduced from more than 5 d in conventional brewing processes to ~2 d or less using the present invention.

Following the combined steeping and germination processes, the methods of the present invention comprise a step of finely dividing the germinated cereal grains. A particularly interesting aspect of the invention is that the methods of the invention allow proceeding with finely dividing the germinated cereal grains immediately after the germination. Accordingly, the methods in general do not comprise a step of drying the germinated cereal grains. In particular, the methods do not comprise a step of kiln drying the germinated cereal grains. As described above, one important aspect of kiln drying is to allow easy removal of rootlets. Prior to drying removal of rootlets is difficult to achieve. However, the germinated cereal grains prepared according to the methods of present invention have significantly reduced rootlets (typically less than 4 g per 100 g germinated barley (dry weight)), and as shown by the present invention, the step of kiln drying is not required in respect of cereal germinated according to the methods of the invention.

The germinated cereal grains may for example be finely divided by subjecting the germinated cereal grains to wet milling, followed by a step of preparing an aqueous extract, for example, by mashing at a predetermined temperature for any suitable time as described herein below in the section "Preparing an aqueous extract". The conversion of released saccharides, e.g. polysaccharides, and proteins can be facilitated during mashing by the addition of mixtures of exogenous enzymes that catalyze the degradation of starch, storage proteins and cell wall polysaccharides. The enzymes can be partially purified from barley itself, from malt or from other sources—or, alternatively, from fungal and/or bacterial enzyme mixtures that can be purchased from commercial sources.

Aside from benefits as described above, the present invention obviates not only the need for kiln-drying the malt, but also the need for transporting the dried grain from the malthouse to the brewhouse. Energy cost savings of up to 50% can be achieved through this combined steeping and germination invention, which may greatly reduce the carbon footprint of the industry. This is of importance because of world-wide, increasing legislative and taxation pressures in most countries to reduce carbon footprints of the malting and brewing industries.

Further in the context of sustainability, the present invention allows the entire production of beer to be performed in already-existing brewery equipment, so that little additional capital expenditure is required.

The invention is further defined in the claims attached hereto.

DESCRIPTION OF DRAWINGS

FIG. 2A shows a collection of grains, whereas FIG. 2B shows individual representative grains. It is notable that already after 24 h at 15° C., the grains had initiated germination (with a visible chit even with only 30 L/h airflow, and several small rootlets were visible after 48 h. After 24 h at 25° C., the grains had initiated germination and contained a visible chit, even with an airflow of only 30 L/h. With a higher airflow, or after 48 h, several small rootlets were visible.

FIG. 3A shows a collection of grains, whereas FIG. 3B shows individual representative grains.

DEFINITIONS

Figure 1:
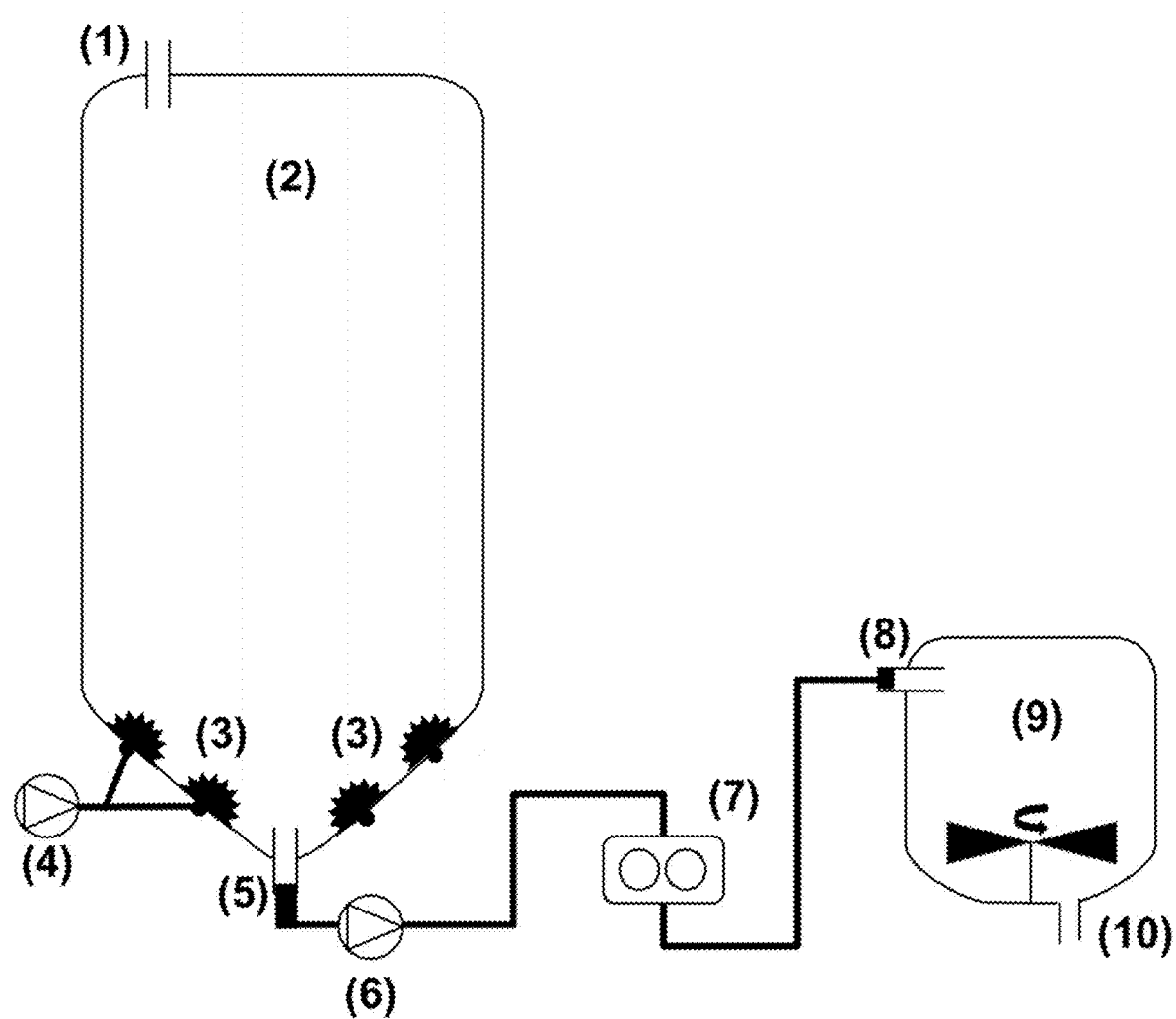
FIG. 1 shows an example of equipment useful for performing the method of the invention in which grains can be immersed in an aqueous solution and aerated continuously. The equipment comprises an inlet for cereal grains (1), a tank, e.g. a steeping tank (2); inlets for gas, e.g. sinter stones (3); a pump e.g. an air pump (4); an outlet for cereal grains (5); a grain pump (6); an equipment for finely dividing cereal grains e.g. a mill (7); an inlet (8); a vessel, e.g. a mashing vessel (9), and; an outlet (10).

The term "approximately" when used herein in relation to numerical values preferably means ±10%, more preferably ±5%, yet more preferably ±1%.

The term "adjunct" as used herein refers to carbon-rich raw material sources added during preparation of beer. The adjunct may be an ungerminated cereal grain, which may be milled together with the germinated grains prepared according to the invention. The adjunct may also be a syrup, sugar or the like.

The term "chit" as used herein refers to the embryonic growing bud that is visible during the germination phase of a cereal grain.

The term "water content" of a grain as used herein refers to the % of water w/w in said grain.

The term "germinated grain" as used herein refers to grains having developed a visible chit, preferably a chit of at least 1 mm, such as of at least 2 mm.

The term "3-glucan" as used herein, unless otherwise specified, refers to the cereal cell wall polymer "(1,3;1,4)-β-glucan".

Similarly, the term "xylan" as used herein, unless otherwise specified, refers to the cereal cell wall polymer "arabinoxylan".

The terms "kiln dried malt" and "kilned malt" as used herein refer to germinated cereal grains, which have been dried by kiln drying.

The term "sprouted grain" as used herein refers to a grain having developed a visible chit and a visible stem.

The term "steeping" as used herein refers to the process of increasing the water content of a cereal kernel.

The term "3-glucanase" as used herein refers to enzymes with the potential to depolymerize cereal β-glucan. Accordingly, unless otherwise specified, the term "3-glucanase" refers to an endo- or exo-enzyme or mixture thereof characterized by (1,3;1,4)-β- and/or (1,4)-β-glucanase activity.

The term "xylanase" as used herein refers to enzymes with the potential to degrade main and side chains of xylan and arabinoxylan. Accordingly, unless otherwise specified, the term "xylanase" refers to an enzyme or an enzyme mixture characterized by enzymic activities derived by one or more of the following enzyme classes: endo-1,4-xylanase; exo-1,4-xylanase; arabinofuranosidase; ferulic acid esterase.

Enzyme activities of cereal grains as used herein refer to the activities measured in flour prepared from the specified grain type. For example, 10 U/g of α-amylase activity per gram cereal grain refers to said α-amylase activity (10 U) measured in an aqueous extract derived from 1 g of flour (dry matter) from said cereal. α-amylase activity is determined by K-CERA 01/12 (protocol and kit available from Megazyme, Ireland). β-amylase activity is determined by the K-BETA3 (protocol and kit available from Megazyme, Ireland). Limit-dextrinase activity is determined by the T-LDZ1000 (protocol and kit available from Megazyme, Ireland).

The volume of a gas as indicated herein refers to the volume of said gas at 1 atm and 20° C.

The volume of $O_2$ as indicated herein refers to the volume of 02 at 1 atm and 20° C. In embodiments of the invention where 02 is comprised in a mixture of gasses, then the total volume of the gas mixture may be determined, and the volume of 02 may be calculated as the percentage of the total volume constituted by $O_2$. By way of example then atmospheric air comprises 21% $O_2$. Thus the volume of 02 within atmospheric air as used herein is 21% of the total volume of atmospheric air.

DETAILED DESCRIPTION

Cereal Grains

The methods of the present invention comprise a step of germination, which comprises incubating cereal grains in an aqueous solution. It should be noted that the mixture of aqueous solution and cereal grains may be considered a suspension.

The cereal grain may be the grain of any cereal, for example a cereal selected from the group consisting of barley, rice, sorghum, maize, millet, triticale, rye, oat and wheat. In preferred embodiments of the invention the cereal grains are barley grains. Said grains may be grains of any barley variety, such as any of the barley varieties described herein below in the section "Barley".

The cereal grains may have a relatively low water content before incubation in said aqueous solution. For example, the cereal grains may have a water content of at the most 30%, preferably at the most 20%, such as at the most 15%, for example in the range of 5 to 15%.

Before incubation in said aqueous solution, the cereal grain may have been subjected to one or more steps of antimicrobial treatment. Said antimicrobial treatment may be any useful antimicrobial treatment, which does not impair the grains potential for germination. The antimicrobial treatment could for example be treatment with one or more antimicrobial agents. Said antimicrobial agents may be any antimicrobial agent, which at the concentrations used is not toxic to cereal grains. For example, the antimicrobial agent may be a chlorine containing compound, e.g. hypochlorite. The antimicrobial agent may also be peroxide, e.g. hydrogen peroxide and/or peracetic acid. Non-limiting examples of useful commercial antimicrobial agents include P3-Hypochloran®, P3-Peroxysan® or P3-oxonia active 150®. Cereal grains may be treated with hypochloran at a concentration in the range of 0.1 to 10%, such as in the range of 0.5 to 5%, for example approximately 1%, such as 1%. The cereal grains may be treated with said hypochloran for in the range of 15 min to 10 h, such as in the range of 1 to 5 h, for example for in the range of 2 to 4 h. After treatment, the cereal grains may be washed one or more times.

In some embodiments of the invention, the antimicrobial treatment is performed by incubating cereal grains in an aqueous solution comprising the antimicrobial agent. Immediately after said incubation, the step of germination may be initiated, e.g. by initiating aeration. Thus, in such embodiments, it is not required to change the aqueous solution, and the same aqueous solution may be used for the antimicrobial treatment and at least during the onset of the subsequent step of germination. This may in particular be the case, when the antimicrobial agent is a peroxide, e.g. hydrogen peroxide.

It may be preferred that said cereal grains have not been subjected to germination prior to the incubation in aqueous solution according to the invention. Accordingly, it may be preferred that the cereal grains have not been subjected to a step of pre-germination.

As described above the cereal grain may be any cereal grain. Some cereal grains comprises a hull, whereas other cereal grains are hull-less. Hulled cereal grains may be treated to remove at least part of the hull prior to the step of germination. In general, treatment of remove hull is not required if a hull-less cereal grain is used. Hull-less cereals include for example hull-less barley varieties and wheat.

Hulled cereal grains may be treated to remove hull by subjecting the cereal grains to physical treatment removing hull. Said physical treatment may for example be selected from the group consisting of polishing, sanding, peeling and smoothening. Preferably, the physical treatment results in a loss of the hull. Loss of the hull may be determined as an overall weight loss. Thus, the physical treatment preferably leads to a loss of in the range of 1 to 4%, such as in a loss of in the range of 1.5 to 3.0% of the total weight of the cereal grains.

Germination

The methods of the present invention comprise a step of germination of cereal grains. The step of germination comprises a step of incubating cereal grains in an aqueous solution typically under aeration.

Incubation in an Aqueous Solution Under Aeration

The cereal grains may be any of the cereal grains described herein above in the section "Cereal grains", and the aqueous solution may be any of the aqueous solutions described herein below in the section "Aqueous solution".

It may be preferred that during said incubation in aqueous solution, then the cereal grains are completely covered by said aqueous solution during the entire incubation. Thus, the cereal grains may for example be incubated in at least 1, preferably at least 1.5, more preferably at least 2, for example in the range of 1 to 10, such as in the range of 1 to 5, for example in the range of 1.5 to 3 L aqueous solution per kg cereal grain (dry weight).

Thus, in some embodiments, the cereal grains are submerged in the aqueous solution during the entire incubation.

In other embodiments, the cereal grains take up the aqueous solution in a manner, so that at the end of the incubation on said aqueous solution all of said aqueous solution is taken up by the cereal grains.

In other embodiments, aqueous solution remaining after incubation under aeration may be drained off the cereal grains.

In some embodiments, it is preferred that after incubation of the cereal grains in said aqueous solution, then the majority, for example at least 70%, preferably at least 80%, more preferably at least 90%, even more preferably, at least 95%, such as essentially all of the cereal grains contain a visible chit of at least 1 mm.

In some embodiments, after incubation of the cereal grains in said aqueous solution, then the majority, for example at least 70%, such as at least 80%, for example at least 90%, such as at least 95%, such as essentially all of the cereal grains contain one or more visible rootlets.

In some embodiments, after incubation of the cereal grains in said aqueous solution, then the majority, for example at least 70%, such as at least 80%, for example at least 90%, such as at least 95%, such as essentially all of the cereal grains contain one or more visible rootlets and a visible stem.

In some embodiments, after incubation of the cereal grains in said aqueous solution, then the cereal grains have a water content of at least 30%, preferably at least 35%, more preferably of at least 37%, for example in the range of 35 to 60%, such as in the range of 35 to 50%, for example in the range of 37 to 60%, such as in the range of 37 to 50%.

The water content of cereal grains may be determined by determining the weight of the cereal grains, followed by drying said cereal grains and determining the weight of the dried cereal grains. The difference in weight of the wet and dry cereal grains is considered to be water, and the water content is provided as the weight of the water divided by the total weight of the cereal grains (wet cereal grains). The water content provided in % is thus a w/w %.

The cereal grains may be incubated in said aqueous solution for sufficient time to allow germination of the majority of said cereal grains as described above. The cereal grains may also be incubated in said aqueous solution for sufficient time in order to obtain aforementioned water content. In some embodiments of the invention, the step of germination comprises an incubation in the aqueous solution followed by an air-rest. In such embodiments the incubation in aqueous solution is performed for a time sufficient to allow sufficient enzyme activity in the germinated cereal grains after the air-rest. The enzyme activity is preferably as described herein below in the section "Germinated cereal grains".

Typically, the cereal grains are incubated in the aqueous solution for at least 20 h, such as at least 24 h. Typically, the grains are incubated in said aqueous solution for at the most 72 h, such as for at the most 60 h, for example for at the most 48 h. Thus, in some embodiments the cereal grains are incubated in said aqueous solution for in the range of 20 to 72 h, such as for in the range of 20 to 60 h, for example for in the range of 20 to 48 h, for example for in the range of 20 to 30 h, such as for in the range of 22 to 26 h.

In some embodiments the cereal grains are incubated in the aqueous solution under aeration for in the range of 24 to 60 h, preferably for in the range of 40 to 55 h, more preferably for in the range of 45 to 50 h. This may in particular be the case in embodiments of the invention, where germination does not comprise a step of air-rest, for example in embodiments, wherein the cereal grains are being finely divided essentially immediately following the incubation in the aqueous solution.

In some embodiments the cereal grains are incubated in the aqueous solution under aeration for in the range of 24 to 70 h, preferably for in the range of 40 to 60 h, more preferably for in the range of 45 to 55 h. This may in particular be the case in embodiments of the invention, where germination does not comprise a step of air-rest, for example in embodiments, wherein the cereal grains are being finely divided essentially immediately following the incubation in the aqueous solution.

In some embodiments the cereal grains are incubated in the aqueous solution under aeration for in the range of 16 to 40 h, preferably for in the range of 16 to 30 h, such as in the range of 20 to 30 h, more preferably for in the range of 22 to 26 h. This may in particular be the case in embodiments of the invention, where germination further comprises a step of air-rest.

The cereal grain may be incubated at any useful temperature, however it may be preferred that incubation is performed at a temperature sufficiently high to allow fast increase in water content. As shown herein below in Example 1, then an increase in the temperature significantly may advance increase in water content. Thus, it may be preferred that the cereal grains are incubated in said aqueous solution at a temperature of at least 15° C., such as at least 20° C., such as at least 25° C. In particular, the cereal grains may be incubated at in the range of 10 to 35° C., preferably in the range of 15 to 30° C., such as in the range of 20 to 30° C., for example in the range of 25 to 30° C.

In particular, in embodiments of the invention wherein the cereal grains are incubated at a temperature in the range of 20 to 30° C., then said cereal grains may be incubated for in the range of 20 to 48 h.

As described herein above, then said cereal grains are frequently incubated in said aqueous solution, while $O_2$ is passed through the aqueous solution. This is also referred to as said cereal grains being incubated in the aqueous solution under aeration. Preferably, $O_2$ is being passed through the aqueous solution continuously during the entire incubation. Said $O_2$ may be passed through the aqueous solution in any useful manner, however frequently a gas containing $O_2$ is introduced at the bottom and/or in the lower part of the container comprising the aqueous solution with the cereal grains. Typically, the gas will diffuse through the aqueous solution/cereal grain mixture and leave the aqueous solution/cereal grain mixture from the top of the aqueous solution. In particular, the incubation may be performed in an apparatus as described herein below in the section "Apparatus". It is also possible that heavy gasses, notably $CO_2$, are withdrawn from the bottom of the container, whereby fresh air/$O_2$ may be provided from the upper part of the container.

Said $O_2$ may be added to said aqueous solution as a pure $O_2$. Frequently, however, said $O_2$ is comprised within a gas mixture. In one embodiment said $O_2$ is comprised within atmospheric air. Thus, the method of the invention may comprise passing atmospheric air through said aqueous solution.

In general, at least 2 L, preferably at least 3 L, more preferably at least 4 L, yet more preferably at least 5 L, even more preferably at least 6 L $O_2$ passes through said aqueous solution per kg cereal grains per h. The weight of said cereal grains is the dry weight. For example, in the range of 2 to 100 L, for example in the range of 2 to 75 L, such as in the range of 2 to 50 L, for example in the range of 4 to 100 L, for example in the range of 4 to 75 L, such as in the range of 4 to 50 L, for example in the range of 6 to 100 L, for example in the range of 6 to 75 L, such as in the range of 6 to 50 L $O_2$ passes through said aqueous solution/cereal grain mixture per kg cereal grains (dry weight) per h.

In one embodiment it is preferred that at least 20 g $O_2$ per kg cereal grain, more preferably at least 30 g $O_2$ per kg cereal grain, yet more preferably at least 40 g $O_2$ per kg cereal grain, for example in the range of 40 to 100 g $O_2$ per kg cereal grain, such as in the range of 40 to 80 g $O_2$ per kg cereal grain, for example in the range of 60 g $O_2$ per kg cereal grain is passed through said aqueous solution/cereal grain mixture per h. The weight of the cereal grain is provided as dry weight. During incubation the cereal grains typically take up at least some of the aqueous solution and accordingly the concentration of $O_2$ in the aqueous solution will typically vary during the incubation. Typically, the amount of $O_2$ supplied per L aqueous solution per h is in the range of 40 to 200 g, preferably in the range of 50 to 150 g.

As noted above, it is frequently atmospheric air that is passed through the aqueous solution. Thus, the method may comprise passing at least 10 L, preferably at least 15 L, more preferably at least 20 L, yet more preferably at least 25 L, even more preferably at least 30 L atmospheric air through said aqueous solution per kg cereal grains per h. The weight of said cereal grains is the dry weight. For example, in the range of 10 to 500 L, for example in the range of 10 to 375 L, such as in the range of 10 to 250 L, for example in the range of 20 to 500 L, for example in the range of 20 to 375 L, such as in the range of 20 to 250 L, for example in the range of 30 to 500 L, for example in the range of 30 to 375 L, such as in the range of 30 to 250 L atmospheric air is passed through said aqueous solution per kg cereal grains (dry weight) per h. In one embodiment in the range of 50 to 110 L, preferably 80 to 100 L atmospheric air is passed through said aqueous solution per kg cereal grains (dry weight) per h.

Air-Rest

In addition to said incubation in aqueous solution under aeration, the cereal grains may also be incubated in air (e.g. in the absence of aqueous solution). The step of incubation in air may also be referred to as "air-rest". Thus, after incubation in aqueous solution under aeration, remaining aqueous solution may be drained off and the cereal grains may be incubated in air. Alternatively, after incubation in aqueous solution under aeration, all aqueous solution has been taken up by the cereal grains, which may then be incubated in air. Said incubation in air is preferably performed under aeration, for example $O_2$ may be passed through the container comprising the cereal grains. Preferably, $O_2$ is being passed through said container during the entire air-rest. The amount of $O_2$ being passed through the container comprising the cereal grains, may be the same amount of $O_2$ as being passed through the aqueous solution as described above. The $O_2$ may be provided in the form of atmospheric air.

The air-rest may be performed for any suitable amount of time, preferably for in the range of 18 to 50 h, more preferably for in the range of 18 to 38 h, for example for in the range of 22 to 35 h.

During the air-rest additional water or aqueous solution may be added to the cereal grains, e.g. by irrigation or sprinkling. However, during the air-rest, the cereal grains should not be submerged in aqueous solution.

Germination Methods

The germination may also comprise several steps of incubation in aqueous solution and/or several steps of air-rest. In general the first step is a step of incubation of cereal grains in an aqueous solution under aeration as described above. Thus, the germination may comprise or consist of the following steps:
   incubation of cereal grains in an aqueous solution under aeration as described above in the section "Incubation in an aqueous solution under aeration"
   incubation of cereal grains in air as described above in the section "Air-rest"

In this embodiment, the incubation of cereal grains in an aqueous solution under aeration may for example be performed for in the range of 16 to 30 h, such as in the range of 20 to 30 h, for example in the range of 22 to 26 h, whereas the air-rest may be performed for in the range of 18 to 38 h, for example in the range of 22 to 35 h.

The germination may also comprise or consist of the following steps:
   incubation of cereal grains in an aqueous solution under aeration as described above in the section "Incubation in an aqueous solution under aeration"
   incubation of cereal grains in air as described above in the section "Air-rest"
   incubation of cereal grains in an aqueous solution under aeration as described above in the section "Incubation in an aqueous solution under aeration"

The germination may also comprise or consist of the following steps:
   incubation of cereal grains in an aqueous solution under aeration as described above in the section "Incubation in an aqueous solution under aeration"
   incubation of cereal grains in air as described above in the section "Air-rest"
   incubation of cereal grains in an aqueous solution under aeration as described above in the section "Incubation in an aqueous solution under aeration"
   incubation of cereal grains in air as described above in the section "Air-rest"

The germination may also comprise or consist of the following steps:
   incubation of cereal grains in an aqueous solution under aeration as described above in the section "Incubation in an aqueous solution under aeration"
   incubation of cereal grains in air as described above in the section "Air-rest"
   incubation of cereal grains in an aqueous solution under aeration as described above in the section "Incubation in an aqueous solution under aeration"
   incubation of cereal grains in air as described above in the section "Air-rest" incubation of cereal grains in an aqueous solution under aeration as described above in the section "Incubation in an aqueous solution under aeration"

The time for each incubation may vary, however typically the entire step of germination, i.e. the total time for all incubations in aqueous solution and all air-rests does not exceed 72 h, more preferably does not exceed 60 h, even more preferably does not exceed 54 h. Thus, it may be preferred that the entire step of germination is performed for in the range of 20 to 72 h, such as for in the range of 24 to 60 h, for example for in the range of 24 to 48 h. Accordingly, if the germination comprises several steps of incubation in aqueous solution and/or air-rests, then each incubation step is generally shorter.

It is preferred that all steps of the germination is performed within the same container. Said container may in particular be a tank, such as any of the tanks described herein below in the section "Apparatus".

In some embodiments one or more exogenous enzymes may be added. For example, one or more enzymes may be added during the step of germination e.g. as described in WO2016/071463.

The cereal grains are preferably finely divided essentially immediately after germination. Accordingly, the methods of the invention do preferably not comprise a step of drying between the step of germination and finely dividing the cereal grains.

Germinated Cereal Grains

The invention relates to a method comprising a step of producing germinated cereal grains.

The germinated cereal grains preferably comprise one or more hydrolytic enzyme activities, for example provided by α-amylases, β-amylases, starch debranching enzymes (such as limit dextrinases), α-glucosidases and proteases.

Frequently, the onset of hydrolytic enzyme activity may be occurring in a timely coordinated manner, and thus the activity of some hydrolytic enzymes may be used as a marker for other hydrolytic enzyme activities.

Accordingly, it is preferred that the germinated cereal grains have an adequate level of measurable α-amylase activity. Preferably, the germinated cereal grains have a measurable α-amylase activity of at least 4 U/g, such as at least 10 U/g cereal grain (dry weight). Thus, preferably the germinated cereal grains may have a measurable α-amylase activity of at least 20 U/g, for example of at least 30 U/g, such as at least 40 U/g, for example at least 50 U/g cereal grains (dry weight). In embodiments of the invention where the cereal grain is wheat the α-amylase activity may be at least 30 U/g. In some embodiments of the invention, the cereal grain may have an α-amylase activity of at least 50 U/g, for example of at least 60 U/g, such as at least 70 U/g cereal grains (dry weight). This may in particular be the case in embodiments where the cereal grains are incubated in an aqueous solution under aeration followed by an air-rest.

The α-amylase activity is preferably determined according to standard methods, e.g. by using the Ceralpha kit (K-CERA) from Megazyme, Ireland. In particular, the α-amylase activity may be determined as described in Example 2 below.

It may also be preferred that the germinated cereal grains have an adequate level of measurable β-amylase activity. Preferably, the germinated cereal grains have a measurable β-amylase activity of at least 5 U/g cereal grain (dry weight). Thus, preferably the germinated cereal grains may have a measurable β-amylase activity of at least 10 U/g, for example at least 15 U/g cereal grains (dry weight).

Preferably, the β-amylase activity is determined according to standard methods, e.g. by using the Betamyl kit (K-BETA3) from Megazyme, Ireland. In particular, the β-amylase activity may be determined as described in Example 2 below.

It is also preferred that the germinated cereal grains have an adequate level of limit dextrinase activity. Preferably, the germinated cereal grains have a limit dextrinase activity of at least 5 mU/g cereal grain (dry weight). Thus, preferably the germinated cereal grains may have a limit dextrinase activity of at least 10 mU/g, for example of at least 15 mU/g, such as at least 20 mU/g cereal grains (dry weight). In embodiments of the invention where the cereal grain is wheat the limit dextrinase activity may be at least 8 U/g. In some embodiments of the invention, the cereal grain may have a limit dextrinase activity of at least 20 U/g, for example of at least 22 U/g, such as at least 25 U/g cereal grains (dry weight). This may in particular be the case in embodiments where the cereal grains are incubated in an aqueous solution under aeration followed by an air-rest.

Preferably the limit dextrinase activity is determined according to standard methods, e.g. by using the Limit Dextrizyme kit T-LDZ1000 from Megazyme, Ireland. In particular, the limit dextrinase activity may be determined as described in Example 2 below.

Interestingly, the germinated cereal grains according to the invention have significantly reduced rootlets compared to conventional green malt. Thus, the germinated cereal grains according to the invention preferably contains at the most 4 g rootlets per 100 g germinated barley, preferably at the most 3 g rootlets per 100 g germinated barley, even more preferably at the most 2 g rootlets per 100 g germinated barley, for example at the most 1.1 rootlets per 100 g germinated barley, wherein both the mass of the rootlets and the mass of the germinated barley is provided as dry weight. The mass of rootlets is preferably determined as described in Example 10 below.

Nitrosamines (NDMA) are chemical compounds of the chemical structure $R^1N(-R^2)-N=O$, that is, a nitroso group bonded to an amine. Most nitrosamines are carcinogenic. Even though the levels of nitrosamines in modern malts are low, the germinated barley kernels according to the invention never-the-less still have a significantly reduced content of NDMA compared to conventional malt. In one embodiment, the germinated barley kernels according to the invention comprise at the most 0.15 µg/kg N DMA, preferably at the most 0.12 µg/kg NDMA, for example at the most 0.10 µg/kg NDMA.

Aqueous Solution

The aqueous solution may be any aqueous solution. The aqueous solution may be considered a solution even though the mixture of aqueous solution and cereal grains may be regarded as a suspension. Frequently, the aqueous solution is water, such as tap water. One or more additional agents may be added to said water, and thus the aqueous solution may be water, such as tap water comprising one or more additional agents. Said additional agents may be comprised in the aqueous solution from the onset or they may be added during the incubation.

Said additional agents may, for example, be compounds capable of accelerating germination of cereal grains. Thus, the aqueous solution may comprise gibberellic acid (GA), for example the aqueous solution may comprise GA at a concentration of at least 100 nM, for example at a concentration of at least 1000 nM, such as at a concentration of in the range of 100 to 100,000 nM, for example at a concentration of in the range of 500 to 2000 nM. Said GA may be present in the aqueous solution from the onset of incubation, or it may be added during incubation. Said GA may any GA, e.g. $GA_3$ or $GA_7$. In one embodiment said GA is $GA_3$.

The additional agent may also be an antifoaming agent. Said antifoaming agent may for example be any food grade antifoaming agent, for example Foamzol FCD511 (AB Vickers, UK).

Apparatus

The methods of the invention may be performed using one or more apparatuses suitable for performing the methods.

For example, the step of incubating cereal grains in an aqueous solution may be performed in a container equipped with one or more air pumps. The container may be any container in which cereal grains can be incubated in an aqueous solution. In some embodiments, the container may be a tank, e.g. a tank as described below.

Figure 8:
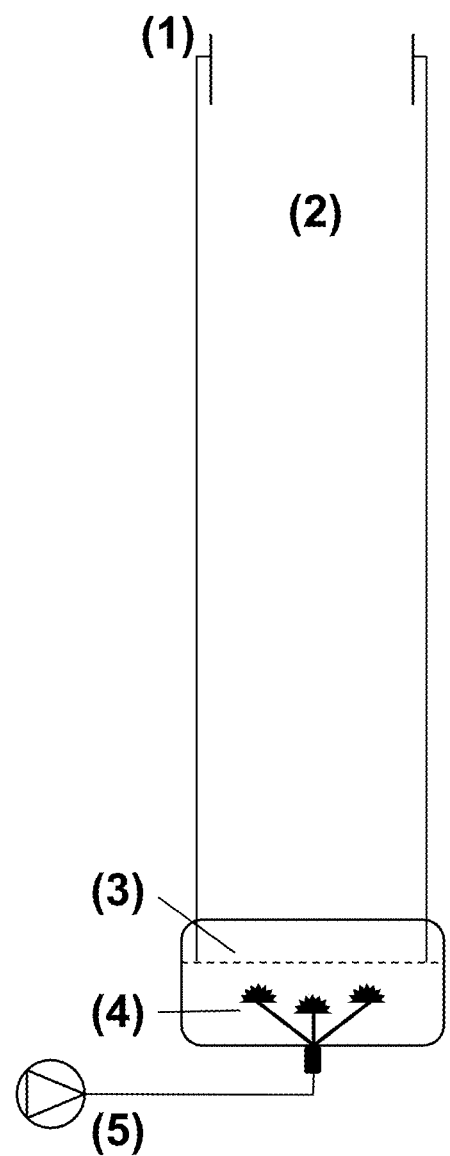
FIG. 8 shows an example of equipment useful for performing the steps of the invention in which grains can be immersed in an aqueous solution and aerated continuously. The equipment comprises: an inlet for cereal grains (1); a tank, e.g. a FlexTank (2); a grid or a mesh, e.g. a meta mesh (3); inlets for gas, e.g. sinter stones (4) and; a pump, e.g. an air pump (5).

One example of an apparatus useful for incubating cereal grains is provided in FIG. 8. The apparatus comprises a tank (2), which should have a sufficient volume to comprise the cereal grains and the aqueous solution. The tank shown in FIG. 8 is cylindrical, but the tank to be used with the invention may have any suitable shape, for example it may be a cylindrical tank, for example a cylindrical tank having a conical bottom part. The tank may be prepared from any suitable material, e.g. plastic (such as Plexiglas) or metal (e.g. stainless steel or copper).

The tank comprises at least one inlet (1) for cereal grains, which can be used to add cereal grains to the tank. The inlet may also be used for adding other compounds to the tank, e.g. the inlet may be used for adding the aqueous solution, e.g. water. The inlet may be positioned at any useful position in the tank, and in some embodiments the inlet is positioned in the upper part of the tank, e.g. at the top of the tank. The inlet should be of a sufficient size to allow addition of cereal grains. Even though not required, the tank may comprise additional inlets in addition to the inlet for cereal grains.

The tank may optionally comprise a grid or mesh (3) positioned essentially horizontally in the tank. If present, such as grid or mesh is typically positioned in the lower ⅓, such as in the lower ⅕, of the tank. The grid or mesh preferably only contains openings, which are smaller than the cereal grains. The grid or mesh may be made from any suitable material, such as plastic or metal, and may for example be a metal mesh. Thus, the grid or mesh may be used to separate the cereal grains from the bottom part of the tank. However, the tank will frequently not comprise a mesh. In particular, if the tank comprise an outlet for cereal grains in the bottom or close to the bottom, then said tank in general do not comprise a grid of mesh.

Furthermore, the tank comprises one or more inlets for gas (4). Said inlets may be any inlet through which a gas comprising $O_2$ can be passed into the tank. The inlets for gas may have a shape, which allows the gas to enter the aqueous solution at a high speed ensuring diffusion of the gas through the aqueous solution. Thus, for example the inlets for gas may be nozzles, jets, diffusion stones or sinter stones. In one embodiment the inlets for gas are sinter stones. The inlets for gas are in general connected to a pump (5), which pump gas into the tank, through said inlets. The pump may be any pump capable of pumping gas, e.g. air through the inlets for gas. It is preferred that the tank comprises multiple inlets for gas, e.g. at least 2, such as at least 3, for example in the range of 3 to 20. The inlets for gas may be positioned at any position in the tank, but usually, they are positioned in the bottom ⅓, such as in the bottom ⅕ of the tank. This allows gas to enter the aqueous solution from the bottom and to diffuse upward through the aqueous solution. Excess gas may leave the tank through any opening in the tank, e.g. through the inlet for adding cereals. In one embodiment it may be preferred that said inlets (3) are positioned directly on the side walls of the tank (2), preferably on the lower part of the side walls, e.g. as shown in FIG. 1.

An example of an apparatus useful for performing several steps of the methods of the invention is shown in FIG. 1. The apparatus comprises an inlet for cereal grains (1), a tank (2), inlet(s) for gas (3) and a pump (4), which may be any of the inlets for cereal grains, tanks, inlets for gas and pumps described herein above in relation to FIG. 8. The tank (2) may comprise an outlet for cereal grains (5) positioned in the lower ⅓, such as lower ⅕ of the tank, e.g. positioned at the bottom of the tank. Said outlet may be used both for removing cereal grains as well as for removal of other components kept in the tank, e.g. the aqueous solution. Said outlet may be connected to a grain pump (6), e.g. via tubing. Said grain pump (6) may be any pump capable of pumping grains from the tank (2) to the equipment for finely dividing the cereal grains (7) and optionally further to the mashing vessel (9).

The apparatus comprises an equipment for finely dividing the cereal grains (7). Said equipment may be any equipment capable of finely dividing cereal grains having a water content of above 20%, for example above 35%. The equipment may in particular be a grinder or a mill, for example a wet mill. The equipment (7) may be connected to the tank (2) and to the vessel (9) by tubing(s). Movement of grains from the tank (2) to the equipment (7) and further to the vessel (9) may be ensured by a pump (6).

The apparatus may also comprise a vessel (9). The vessel (9) may be any vessel, which can comprise a aqueous extract and which can withstand temperatures used for mashing, e.g. temperatures of up to 90° C., such as up to 85° C., for example up to 80° C. Thus, the vessel can be made of any material tolerating such temperatures, e.g. of metal, such as stainless steel or copper. The vessel may have any useful shape, e.g. it may be essentially cylindrical. The vessel may be associated with equipment for temperature control. The vessel may be used for preparing an aqueous extract of the finely divided cereal grains through a process involving incubation at one or more predefined temperatures as described herein in the section "Preparing an aqueous extract". Said equipment for temperature control is capable of controlling the temperature of a liquid within the vessel, including being capable of heating a liquid within the vessel to a predetermined temperature, e.g. to any of the temperatures described herein in the section "Preparing an aqueous extract". The vessel (9) may also comprise equipment for stirring or rotating any liquid contained in said vessel. In particular, the vessel (9) may be a mashing vessel. Mashing vessels are well known in the art, and the vessel (9) may be any conventional mashing vessel.

The vessel (9), in general, contains an inlet (8), through which the finely divided germinated cereal grains can enter the vessel. Said inlet (8) is typically positioned in the upper half of the vessel, e.g. in the upper ⅓, such as in the upper ⅕ of the vessel, for example at the top of vessel. The finely divided cereal grains may be led via tubing from the equipment for finely dividing the cereal grains (7) to the inlet (8) of the vessel (9).

Generally, the vessel (9) also contains an outlet (10), through which the aqueous extract can exit the vessel after preparation of the aqueous extract (see details on the aqueous extract herein below in the sections "Aqueous extract" and "Preparing an aqueous extract". The outlet is typically positioned in the lower half, for example in the lower ⅓, such as in the lower ⅕ of the vessel, for example at the bottom of the vessel.

Finely Dividing Germinated Cereal Grains

The methods of the invention comprise a step of finely dividing cereal grains germinated by incubation in an aqueous solution under aeration.

At the time that said cereal grains are finely divided they preferably still have a high water content, preferably said cereal grains have a water content of at least 20%, more preferably of at least 25%, even more preferably of at least 30%, yet more preferably of at least 35%. For example, the germinated cereal grains may be transferred directly from incubation in said aqueous solution to the equipment for finely dividing cereal grains. Accordingly, the germinated cereal grains may have the same water content at the time of being finely divided as the cereal grains have immediately after incubation of the cereal grains in the aqueous solution, for example the water content described herein above in the section "Germination". In particular, the methods do in general not comprise a step of drying the germinated cereal grains by subjection to elevated temperatures. Preferably, the germinated cereal grains do not have a water content of less than 20%, preferably not less than 25%, even more preferably not less than 30%, yet more preferably not less than 35% at any time after germination and prior to finely dividing said cereal grains. Thus, the methods do preferably not comprise a step of kiln drying the germinated cereal grains.

The germinated cereal grains may be finely divided using any equipment suitable for finely dividing cereal grains having a water content of more than 20%, such as more than 25%, for example more than 30%, such as more than 35%. For example, the germinated cereal grains may be subjected to milling, for example wet milling. Useful mills for milling germinated cereal grains include the mills available from Millstar, USA. The germinated cereal grains may also be subjected to grinding.

The cereal grains are, generally, finely divided to an extent so that an aqueous extract of the fermentable sugars of the cereal grains can be made. Thus, the cereal grains are sufficiently divided, such that a 7-L aqueous extract of 1 kg of said finely divided cereal grains has a specific gravity of at least 8° Plato.

In embodiments of the invention, wherein the aqueous extract is made from the germinated cereal grains and one or more adjuncts, said adjuncts may also be finely divided. In particular, this may be the case when said adjuncts comprise ungerminated cereal grains. Said adjuncts may be finely divided, e.g. milled in separate proceedings. However, it is also comprised within the invention that the adjuncts are finely divided together with the germinated cereal grains. Similarly, if the aqueous extract is made from the germinated cereal grains and kiln dried malt, then said kiln dried malt may be finely divided, e.g. milled in separate proceedings. However, it is also comprised within the invention that the kiln dried malt is finely divided together with the germinated cereal grains.

Preparing an Aqueous Extract

The methods of the invention also comprise a step of preparing an aqueous extract of the finely divided germinated cereal grains. Said step may, for example, be a step of mashing.

The aforementioned aqueous extract may, in general, be prepared by incubating the finely divided cereal grains in water or in an aqueous solution. The aqueous solution for preparing an aqueous extract is, in general, a different aqueous solution as compared with the aqueous solution used for incubation of the cereal grains during germination.

In order to distinguish, the aqueous solution for preparing an aqueous extract may also be referred to as "mashing solution". The mashing solution may be any aqueous solution, but it typically consists of water, such as tap water to which one or more additional agents may be added. In order to distinguish between additional agents added during germination, these additional agents may be referred to as "additional mashing agents". Thus, the mashing solution may consist of water (e.g. tap water) to which one or more additional mashing agents are added. The mashing agents may be present in the mashing solution from the onset or they may be added during the process of preparing an aqueous extract.

Said additional mashing agents may be enzymes. Thus, the mashing solution may comprise one or more enzymes. Said enzymes may be added to the mashing solution from the onset, or subsequently, during the process.

Said enzymes may, for example, be one or more hydrolytic enzymes. Suitable enzymes include lipases, starch degrading enzymes (e.g. amylases), glucanases [preferably (1-4)- and/or (1,3;1,4)-β-glucanases], and/or xylanases (such as arabinoxylanases), and/or proteases, or enzyme mixtures comprising one or more of the aforementioned enzymes, e.g. Cereflo, Ultraflo, or Ondea Pro (Novozymes). For example, the mashing solution may comprise one or more hydrolytic enzymes wherein at least one hydrolytic enzyme is selected from the group consisting of α-amylase, β-amylase, limit dextrinase, pullulanase, β-glucanase, xylanase, glucoamylase and protease.

In one embodiment of the invention the mashing solution comprises one or more of the following enzymes:

A β-glucanase, such as an endo-(1,3;1,4)β-glucanase or an endo-1,4-β-glucanase.

A xylanase, such as an endo- or exo-1,4-xylanase, an arabinofuranosidase or a ferulic acid esterase An α-amylase A pullulanase or a limit dextrinase A glucoamylase.

Whether or not to add enzymes to the mashing solution, and decisions on which enzymes to add, may dependent on the cereal grains used. Thus, in embodiments of the invention, wherein the cereal is a barley plant with low levels of β-glucan (e.g. as described herein below in the section "Barley"), then little or no β-glucanase may be added to the mashing solution.

In one embodiment it is preferred that no exogenous protease is added during mashing. Addition of protease may be less preferable, because proteases may affect enzyme activity. In one embodiment it is preferred that no exogenous lipase is added during mashing.

In one embodiment it is preferred that at the most 700 U, preferably at the most 350 U exogenous glucoamylase per g germinated cereal grains (dry matter) is used during preparation of the aqueous extract.

In one embodiment it is preferred that at the most 400 AGU, preferably at the most 200 AGU exogenous glucoamylase per kg germinated cereal grains (dry matter) is used during preparation of the aqueous extract. Determination of AGU may be performed as described in US7060468.

In another embodiment it is preferred that the combined exogenous glucoamylase and α-amylase used during preparation of the aqueous extract does not exceed 700 U, preferably does not exceed 350 U per g germinated cereal grains (dry matter). The combined glucoamylase and α-amylase activity may for example be determined using K-CERA 01/12 (protocol and kit available from Megazyme, Ireland).

In one embodiment it is preferred that at the most 20 U exogenous pullulanase or limited dextrinase per kg germinated cereal grains (dry matter) is used during preparation of the aqueous extract.

In one embodiment it is preferred that at the most 100 PUN pullulanase per kg germinated cereal grains (dry matter) is used during preparation of the aqueous extract. Determination of PUN may be performed as described in US7060468.

Said additional mashing agents may also be adjuncts, for example ungerminated cereal grains, syrups or sugars. If adjuncts are added, these may also have been finely divided e.g. by milling or grinding. If the adjunct is a cereal grain, for example a cereal grain, which has not been subjected to germination, then it may typically be finely divided or milled. If the adjunct is syrups, sugars or the like, these will generally not be milled. Adjunct such as sugars or syrups may be added to the mashing solution at any time in the process; however, such adjuncts may also be added to the aqueous extract or later during the process for preparing a beverage as described below. In general, the adjuncts are added in smaller quantities than the germinated cereal grains. Thus, at least 50%, preferably at least 70%, for example at least 90% of the carbohydrates of the aqueous extract are derived from the germinated cereal grains, whereas adjuncts preferably only accounts for a minor part of the carbohydrates. If the adjunct is an ungerminated cereal grain, then it is preferred that the germinated cereal grains constitutes at least 50% (w/w), preferably at least 70% (w/w), more preferably at least 90% (w/w) of the total cereal grains as determined per dry weight.

The additional mashing agents may also be kiln dried malt. If kiln dried malt is added, it may also have been finely divided e.g. by milling or grinding. In general, the kiln dried malt is added in smaller quantities than the germinated cereal grains. Thus, the germinated cereal grains constitute at least 80% (w/w), preferably at least 90% (w/w), more preferably at least 95% (w/w) of the total cereal grains and malt as determined per dry weight. In preferred embodiments, no kiln dried malt is added.

Said additional mashing agents, preferably of food grade quality, may also be a salt, for example $CaCl_2$.

Said additional mashing agents may also be an acid, preferably a food grade acid, for example $H_3PO_4$.

The aqueous extract is generally prepared by incubation of the finely divided germinated cereal grains in the mashing solution at one or more predetermined temperature(s). Said predetermined temperature may also be referred to as "mashing temperature" herein. Said mashing temperatures may for example be conventional temperatures used for mashing.

The mashing temperature is in general either kept constant (isothermal mashing), or gradually increased, for example increased in a sequential manner. In either case, soluble substances in the finely divided germinated cereal grains are liberated into said mashing solution thereby forming an aqueous extract.

The mashing temperature(s) are typically temperature(s) in the range of 30 to 90° C., such as in the range of 40 to 85° C., for example in the range of 50 to 85° C. The mashing temperatures may be chosen according to the cereal type used. Accordingly, in embodiments of the invention, wherein the cereal grains are barley with low levels of or absent lipoxygenase (LOX) activity and/or methyl methionine transferase (MMT) activity (see details herein below in the section "Barley"), the mashing temperature may be lower, for example in the range of 35 to 69° C.

Incubation in the mashing solution may be performed for any suitable amount of time. The time for incubation in the mashing solution in the mashing vessel may, e.g., be for in the range of 60 to 300 min, such as in the range of 60 to 240 min, for example in the range of 90 to 300 min. such as in the range of 90 to 240 min, for example in the range of 90 to 270 min. For example said time for incubation in the mashing solution may be any time used in conventional mashing. One non-limiting example of a suitable mashing is:

(1) Mashing-in at a temperature in the range of 50-60° C., such as approximately 55° C., in the range of 10 to 30 min, such as approximately 15 min.
(2) Heating to a temperature in the range of 60 to 70° C., preferably in the range of 60 to 65° C., such as approximately 62° C., in the range of 30 to 90 min, such as approximately 60 min.
(3) Heating to a temperature in the range of 70 to 75° C., such as approximately 72° C., in the range of 5 to 30 min, such as approximately 15 min.
(4) Heating to a temperature in the range of 75 to 80° C., preferably in the range of 75 to 78° C., such as approximately 78° C., in the range of 5 to 15 min, such as approximately 10 min.

Subsequent to incubation in the mashing solution in the mashing vessel, the finely divided germinated cereal grains in the mashing solution may be transferred to another container, e.g. a lauter tun and incubated for additional time at elevated temperature, e.g. at in the range of 70 to 78° C. for in the range of 30 to 120 min.

Thus, the incubation in the mashing solution may in addition to aforementioned steps also comprise a step (5) of:

(5) Heating to a temperature in the range of 70 to 78° C., preferably in the range of 75 to 78° C., such as approximately 78° C., in the range of 30 to 120 min, such as approximately 60 min.

Figure 5:
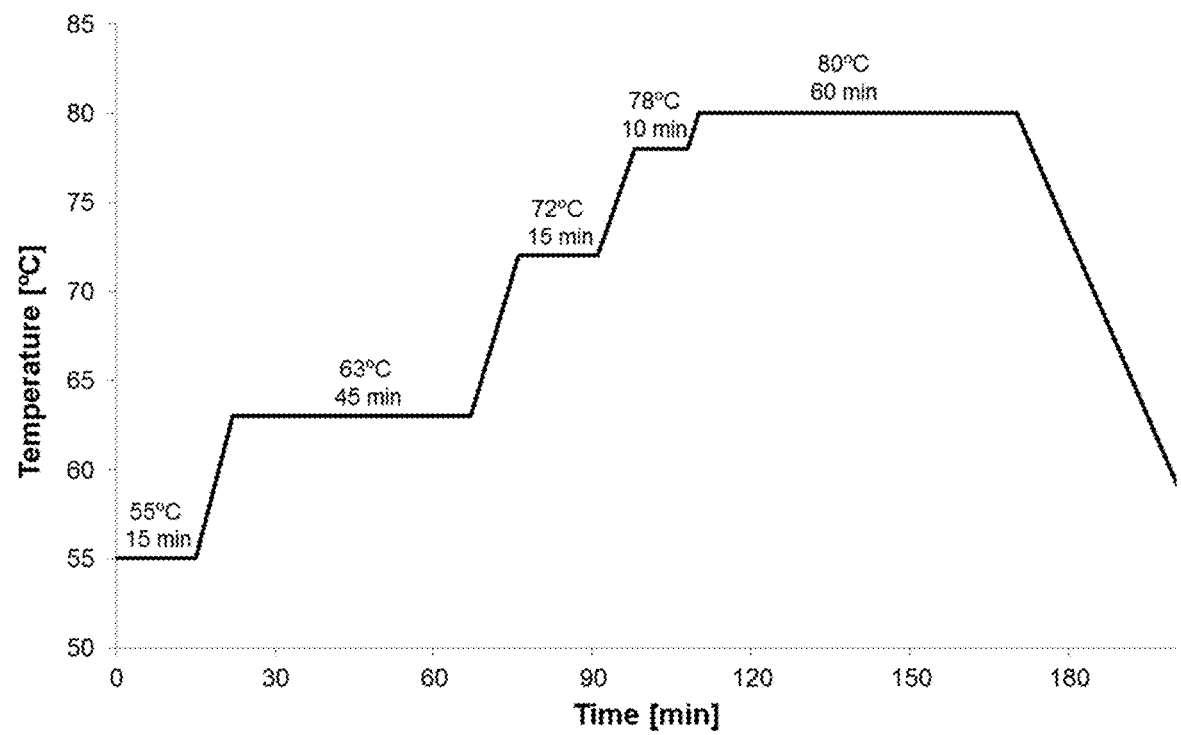
FIG. 5 shows an example of a mashing process with steeped, germinated and wet-milled grains.

One non-limiting example of useful mashing temperatures and time is shown herein in FIG. 5. The incubation for the first approximately 120 min may for example be performed in a mashing vessel, whereas the remainder of the incubation for example may be performed in another container. Other non-limiting examples can be found in the literature of brewing, e.g. in Briggs et al. (supra) and Hough et al. (supra).

After incubation in the mashing solution, the aqueous extract may typically be separated, e.g. through filtration into the aqueous extract and residual non-dissolved solid particles, the latter also denoted "spent grain". Filtering may for example be performed in a lauter tun. Alternatively, the filtering may be filtering through a mash filter. The aqueous extract thus obtained may also be denoted "first wort".

Additional liquid, such as water may be added to the spent grains during a process also denoted sparging. After sparging and filtration, a "second wort" may be obtained. Further worts may be prepared by repeating the procedure.

Thus, the aqueous extract may be wort, e.g. a first wort, a second wort, a further wort or a combination thereof.

Aqueous Extract

The aqueous extract prepared by the methods of the invention may have a number of useful properties, including—but not limited to—the properties described in this section.

As mentioned above, the aqueous extract may be subjected to a step of filtration. Accordingly, it may be preferred that the wort has good filterability. For example, it may be technically challenging to filter highly viscous liquid—a reason that it may be preferred that the aqueous extract has a low viscosity.

Filterability may be determined in a number of ways. In one embodiment the filterability is determined as the amount of liquid obtained after filtration through a filter funnel equipped with a filter paper for 1 h. Preferably the aqueous extract has a filterability of at least 250 mL, when 400 mL mashing solution comprising 100 g finely divided cereal grains is added to said filter funnel. Filterability may also be determined as the percentage of the volume of liquid obtained after filtration for 60 min as described above compared to the volume of liquid of the aqueous extract added to said funnel. Thus, the filterability may be at least 50%, such as of at least 60% (v/v). In particular, filterability may be determined as described herein below in Example 3.

Filterability may frequently be dependent on the level of β-glucan. Accordingly, it may be preferred that the level of β-glucan is not too high. For example the aqueous extract may comprise at the most 200 mg/L, preferably at the most 150 mg/L β-glucan.

It is also preferred that the aqueous extract comprises an adequate level of fermentable sugars. In particular it may be preferred that the aqueous extract comprises at least 10 g, such as at least 15 g maltose per L. For example, it may be preferred that the aqueous extract comprises at least 1 g/L per ° Plato maltose. It may also be preferred that said aqueous extract comprises at least 1 g, such as at least 2 g glucose per L.

It is generally desirable that wort contains free amino nitrogen (FAN) at levels which are high enough to obtain good yeast viability, whereas very high levels may be undesirable. Accordingly, it may be preferred that the aqueous extract comprises in the range of 150 to 400 mg/L, such as in the range of 150 to 300 mg/L, for example in the range of 150 to 250 mg/L FAN.

It is generally desirable that wort contains high levels of the amino acid valine, because that may reduce the likelihood of undesired diacetyl formation. Accordingly, it may be preferred that the aqueous extract comprises at least 55 mg/L, for example at least 60 mg/L valine. In one embodiment, the aqueous extract comprises at least 65 mg/L valine.

Aforementioned levels of sugars, FAN and amino acids are preferably levels in the aqueous extract prior to any fermentation.

Preparing Beverages

In some embodiments, the methods of the invention also comprise a step of processing the aqueous extract prepared by the methods of the invention into a beverage.

The aqueous extract may be boiled with or without hops where after it may be referred to as boiled wort.

First, second and further worts may be combined, and thereafter subjected to heating or boiling. The aqueous extract may be heated or boiled for any suitable amount of time, e.g. in the range of 60 min to 120 min. During heating or boiling the volume of the aqueous extract may be reduced due to evaporation. It may be preferred that the volume of the aqueous extract is reduced by less than 8%, preferably by less than 5%. This may reduce energy consumption significantly.

The beverage may be prepared by fermentation of the aqueous extract, e.g. by fermentation of wort. Thus, the beverage may be prepared by fermentation of the aqueous extract with yeast.

In one embodiment, the beverage may be an alcoholic beverage, such as beer. In other embodiments, the beverage may be a non-alcoholic beverage based on germinated cereal grains. The non-alcoholic beverage, may for example be a non-alcoholic beer or other kinds of non-alcoholic beverages, such as maltina.

In one preferred embodiment the beverage is beer, for example the beer may be a lager beer or an ale. Thus, the beer may for example be selected from the group consisting of Altbier, Amber ale, Barley wine, Berliner weisse, Bière de Garde, Bitter, Blonde Ale, Bock, Brown ale, California Common, Cream Ale, Dortmunder Export, Doppelbock, Dunkel, Dunkelweizen, Eisbock, Fruit Iambic, Golden Ale, Gose, Gueuze, Hefeweizen, Helles, India pale ale, Kölsch, Lambic, Light ale, Maibock, Malt liquor, Mild, Märzenbier, Old ale, Oud bruin, Pale ale, Pilsener, Porter, Red ale, Roggenbier, Saison, Scotch ale, Steam beer, Stout, Schwarzbier, lager, Witbier, Weissbier and Weizenbock. The aqueous extract according to the invention is prepared from germinated cereal grains, which have not been subject to kiln drying. Germinated cereal grains, which have not been kiln dried, generally have a lighter colour, and accordingly, the methods of the invention are particularly useful for preparation of lighter beers, in particular for preparation of lager beer. Darker beers may also be prepared by the methods of the invention, e.g. by adding one or more kiln dried malts during mashing as described in the section "Preparing beverages".

Thus, the invention also relates to methods of producing a beverage comprising the steps of:
Preparing an aqueous extract by the method according to the invention.
Processing said extract into a beverage.

Alcoholic beverages—such as beer—may according to the methods of the invention be manufactured from germinated cereal grains. Germinated cereal grains, in addition to hops and yeast, contributes to flavour and colour of the beer.

Once the aqueous extract has been prepared it may be processed into beer by any method including conventional brewing methods. Non-limited descriptions of examples of suitable methods for brewing can be found, for example, in publications by Briggs et al. (1981) and Hough et al. (1982). Numerous, regularly updated methods for analyses of barley and beer products are available, for example, but not limited to, American Association of Cereal Chemists (1995), American Society of Brewing Chemists (1992), European Brewery Convention (1998), and Institute of Brewing (1997). It is recognized that many specific procedures are employed for a given brewery, with the most significant variations relating to local consumer preferences. Any such method of producing beer may be used with the present invention.

The first step of producing beer from the aqueous extract preferably involves heating said aqueous extract as described herein above, followed by a subsequent phase of cooling and optionally whirlpool rest. One or more additional compounds may be added to the aqueous extract, e.g. one or more of the additional compounds described below in the section "Additional compounds". After being cooled, the aqueous extract may be transferred to fermentation tanks containing yeast, e.g. brewing yeast, such as S. pastorianus or S. cerevisiae. The aqueous extract may be fermented for any suitable time period, in general in the range of 1 to 20, such as 1 to 10 d. The fermentation is performed at any useful temperature e.g. at a temperature in the range of 10 to 20° C. The methods may also comprise addition of one or more enzymes, e.g. one or more enzymes may be added to the wort prior to or during fermentation. In particular, said enzyme may be a proline-specific endoprotease. A non-limiting examples of a proline-specific endoprotease is "Brewer's Clarex" available from DSM. In other embodiments, no exogenous enzymes are added during the methods.

During the several-day-long fermentation process, sugar is converted to alcohol and $CO_2$ concomitantly with the development of some flavour substances. The fermentation may be terminated at any desirable time, e.g. once no further drop in % P is observed.

Subsequently, the beer may be further processed, for example chilled. It may also be filtered and/or lagered—a process that develops a pleasant aroma and a less yeast-like flavour. Additives may also be added. Furthermore, $CO_2$ may be added. Finally, the beer may be pasteurized and/or filtered, before it is packaged (e.g. transferred to containers or kegs, bottled or canned). The beer may also be pasteurized by standard methods.

The beer produced by the methods of the invention typically have a pleasant taste, and lacks or only have little astringency. Taste may be analyzed, for example, by a specialist beer taste panel.

Barley

In preferred embodiments of the invention the cereal grains to be used with the methods of the invention are barley grains.

Said grains may be grains of any barley plant. However, in some embodiments, the barley plant may comprise one or more specific characteristics, for example, one or more of the characteristics as described herein below. Even though the various characteristics are discussed individually herein below, the barley plant of the invention may have a combination of these characteristics.

In one embodiment of the invention, the barley may be a hull-less barley variety (var.). It is also comprised within the invention that the barley is a barley var. with naturally thin husk, such as var. Admiral. For example, the husk may constitute less than 7% of the total weight of grain and husk.

As mentioned above, it is preferable that the aqueous extract obtained during mashing has a viscosity sufficiently low to allow good filterability of the mash mixture. As also described in detail above, soluble β-glucans may contribute to high viscosity of an aqueous extract. Accordingly, in some embodiments of the invention, it may be preferred to use a cereal plant—and in particular a barley plant having a low level of β-glucan, e.g. no β-glucan, such as a level of β-glucan that is below the detection level. These barley plants are known in the art and include, for example, barley plants carrying a mutation in the gene encoding a β-glucan synthase. Said gene may be a gene encoding the polypeptide of SEQ ID NO:2 set forth in US2012/0030784. For example, the barley plant may be a barley comprising a β-glucan-deficient gene as set forth in SEQ ID NO:1 or SEQ ID NO:18 of US2012/0030784. The barley plant may also be that containing a silenced CsIF6 gene, leading to barley grains with very low levels of (1,3;1,4)-β-glucan (as described by Taketa et al., 2011).

The barley plant may also be a barley plant having a low level of LOX activity. Such barley plants are known in the art, and include, for example, barley plants carrying a mutation in the gene encoding LOX-1. For example, the barley plant may be a barley plant carrying any of the mutations in the LOX-1 gene described in WO 02/053721, WO 2005/087934 and WO 2004/085652.

The barley plant may also be a barley plant carrying a mutation in the gene encoding lipoxygenase 1 (LOX-1) and/or in the gene encoding LOX-2. For example, the barley plant may be a barley plant carrying any of the mutations in the LOX-1 and LOX-2 genes described in WO 2010/075860.

The barley plant may also be a barley plant having a low level of MMT activity. Such barley plants are known in the art and include, for example, barley plants carrying a mutation in the gene encoding MMT. Specifically, the barley plant may be a barley plant carrying any of the mutations in the MMT gene described in WO 2010/063288. The barley plant may also be any of the barley plants described in WO 2011/150933.

The barley plant may also be a barley plant characterised by increased GA signalling. In particular, the barley plant may be a barley plant carrying a mutation in the Slender1 gene, which encodes the DELLA protein. For example, the barley plant may be a barley plant carrying any of the mutations described by Chandler et al., *Journal of Experimental Botany*, Vol. 64, No. 6, pp. 1603-1613, 2013, doi: 10.1093/jxb/ert022, e.g. in Table 1 therein. For example, the barley plant may carry a mutation in the Slender1 gene resulting in a mutant Slender1 gene encoding a mutant DELLA protein, wherein said mutant DELLA protein carries a mutation in one or more of amino acids number 46, 490, 280, 268, 271, 277, 231, 481, 282, 277, 227, 485 or 237, for example a mutation selected from the group consisting of G46E, S490F, R268H, G271D, A277T, V231M, R481H, V282F, A277T, G227E, S485F and C237Y. The amino acid numbering is provided in relation to the sequence of the DELLA protein available under the Genbank accession no. AK372064 or AF035820 (version as of 4 Feb. 2013).

Beverage

Beverages prepared by processing an aqueous extract according to the invention into a beverage may have a number of useful properties, including—but not limited to—the properties described in this section.

It is generally desirable that the beverages according to the invention contain as little diacetyl as possible. Accordingly, it may be preferred that the beverage comprises diacetyl at a level, which is below the threshold considered off-flavor in lager beer. Preferably, the beverage comprises at the most 30 ppb diactyl, more preferably at the most 25 ppb diacetyl, even more preferably at the most 20 ppb diacetyl. This is in particular the case if the beverage is beer, for example lager beer.

The beverage according to the present invention may for example be an aqueous extract as described herein, which optionally has been fermented. Thus, the beverage may comprise or consist of said aqueous extract or fermented aqueous extract and optionally one or more additional compounds. Said additional compounds may for example be any of the additional compounds described herein below in the section "Additional compounds".

Additional Compounds

The methods of the invention may comprise the step of adding one or more additional compounds. Said additional compounds may for example be a flavor compound, a preservative, a functional ingredient, a color, a sweetener, a pH regulating agent or a salt. The pH regulating agent may for example be a buffer or an acid, such as phosphoric acid.

Functional ingredients may be any ingredient added to obtain a given function. Preferably a functional ingredient renders the beverage healthier. Non-limiting examples of functional ingredients includes vitamins or minerals.

The preservative may be any food grade preservative, for example it may be benzoic acid, sorbic acid, sorbates (e.g. potassium sorbate), sulphites and/or salts thereof.

The additional compound may also be $CO_2$. In particular, $CO_2$ may be added to obtain a carbonated beverage.

The flavour compound to be used with the present invention may be any useful flavour compound. The flavour compound may for example be selected from the group consisting of aromas, plant extracts, plant concentrates, plant parts and herbal infusions. In particular the flavor compounds may be hops.

Items

The invention may further be described by the following items:

1. A method for producing an aqueous extract of a cereal, said method comprising the steps of:
   a. providing grains of a cereal;
   b. incubating said grains in an aqueous solution until the grains have a water content of at least 35%, wherein at least 2 L $O_2$ per kg dry weight cereal grains is passed through said aqueous solution per h, thereby producing germinated grains;
   c. finely dividing said germinated grains, while said germinated grains have a water content of at least 35%;
   d. preparing an aqueous extract of said milled germinated grains,
   thereby producing an aqueous extract of the cereal.

2. A method for producing an aqueous extract of a cereal, said method comprising the steps of:
   a. providing grains of a cereal;
   b. subjecting the cereal grains to a step of germination thereby obtaining germinated grains, wherein said step of germination comprises incubating said grains in an aqueous solution until the grains have a water content of at least 30%, wherein at least 2 L $O_2$ per kg dry weight cereal grains is passed through said aqueous solution per h;
   c. finely dividing said germinated grains, while said germinated grains have a water content of at least 20%; with the proviso that said cereal grains do not have a water content below 20% at any time between steps b) and c),
   d. preparing an aqueous extract of said milled germinated grains,
   thereby producing an aqueous extract of the cereal.

3. The method according to any one of the preceding items, wherein said grains are incubated in said aqueous solution for in the range of 20 to 72 h.

4. The method according to any one of the preceding items, wherein the grains of the cereal are submerged in the aqueous solution during the entire step of germination.

5. The method according to any one of the preceding items, wherein the grains of the cereal are submerged in aqueous solution, wherein at least 2 L $O_2$ per kg dry weight cereal grains is passed through said aqueous solution per h for in the range of 24 to 60 h, preferably for in the range of 40 to 55 h.

6. The method according to any one of items 1 to 3, wherein the step of germination comprises
   i. at least one step of incubating said grains in an aqueous solution, wherein at least 2 L $O_2$ per kg dry weight cereal grains is passed through said aqueous solution per h; and
   ii. at least one step of incubating said cereal grains in air.

7. The method according to item 6, wherein said at least one step of incubating said grains in an aqueous solution is performed for in the range of 16 to 40 h, preferably for in the range of 20 to 30 h.

8. The method according to any one of items 6 to 7, wherein the step of incubating said cereal grains in air is performed under aeration.

9. The method according to any one of items 6 to 8, wherein the step of incubating said cereal grains in air is performed for in the range of 18 to 50 h, more preferably for in the range of 18 to 38 h, for example for in the range of 22 to 35 h.

10. The method according to any one of the preceding items, wherein the entire step of germination does not exceed 72 h, more preferably does not exceed 60 h, even more preferably does not exceed 54 h.

11. The method according to any one of the preceding items, wherein said aqueous solution is water.

12. The method according to any one of the preceding items, wherein the method further comprises adding gibberellic acid (GA) to the aqueous solution.

13. The method according to item 12, wherein said GA is added to the aqueous solution at a concentration of at least 100 nM, for example at least 1000 nM.

14. The method according to any one of the preceding items, wherein at least 3 L, more preferably at least 4 L, yet more preferably at least 5 L, even more preferably at least 6 L $O_2$ per kg dry weight of cereal grains is passed through said aqueous solution per h.

15. The method according to any one of the preceding items, wherein at least 20 g $O_2$ per kg cereal grain, more preferably at least 30 g $O_2$ per kg cereal grain, yet more preferably at least 40 g $O_2$ per kg cereal grain, for example in the range of 40 to 100 g $O_2$ per kg cereal grain, such as in the range of 40 to 80 g $O_2$ per kg cereal grain, for example in the range of 60 g $O_2$ per kg cereal grain (dry matter) is passed through said aqueous solution/cereal grain mixture per h.

16. The method according to any one of the preceding items, wherein said $O_2$ is comprised within a gas mixture.

17. The method according to item 16, wherein the gas mixture is atmospheric air.

18. The method according to any one of the preceding items, wherein at least 10 L, preferably at least 15 L, more preferably at least 20 L, yet more preferably at least 25 L, even more preferably at least 30 L atmospheric air per kg dry weight cereal grains is passed through said aqueous solution per h.

19. The method according to any one of the preceding items, wherein the aqueous solution further comprises an antifoaming agent.

20. The method according to any one of the preceding items, wherein the incubation is performed at a temperature in the range of 15 to 30° C., preferably at approximately 25° C.

21. The method according to any one of the preceding items, wherein the grains are kept in the same vessel during step b.

22. The method according to any one of the preceding items, wherein the cereal grains are incubated in said aqueous solution until they have a water content of at least 35%, such as at least 37%.

23. The method according to any one of the preceding items, wherein the grains provided in step a., have been treated with an antimicrobial agent.

24. The method according to item 23, wherein the antimicrobial agent is a peroxide, such as hydrogen peroxide.

25. The method according to any one of the preceding items wherein the method does not comprise a step of rootlet removal.

26. The method according to any one of the preceding items, wherein the cereal is a hulled cereal, for example a hulled barley.

27. The method according to item 26, wherein the method comprises a step of removing at least part of said hull prior to incubating said grains in an aqueous solution.

28. The method according to item 27, wherein removal of said hull results in a loss of in the range of 1 to 4%, such as in a loss of in the range of 1.5 to 3.0% of the total weight of the cereal grains.

29. A method for producing an aqueous extract of a cereal, said method comprising the steps of:
   A. providing germinated grains of a cereal having a water content of at least 35%;
   B. finely dividing said germinated grains, while said germinated grains have a water content of at least 35%;
   C. preparing an aqueous extract of said milled germinated grains,
   thereby producing an aqueous extract of the cereal.

30. A method for producing an aqueous extract of a cereal, said method comprising the steps of:
   A. providing germinated grains of a cereal having a water content of at least 20% with the proviso that said cereal grains have not had a water content below 20% at any time subsequent to germination;
   B. finely dividing said germinated grains, while said germinated grains have a water content of at least 20%;
   C. preparing an aqueous extract of said milled germinated grains,
   thereby producing an aqueous extract of the cereal.

31. The method according to any one of the preceding items, wherein the germinated cereal grains have a water content of at least 25%, even more preferably of at least 30%, yet more preferably of at least 35% at the time of finely dividing said cereal grains.

32. The method according to any one of the preceding items, wherein the germinated cereal grains have not had a water content of less than 25%, even more preferably of less than 30%, yet more preferably of less than 35% at any time between completion of the step of germination and the time of finely dividing said cereal grains.

33. The method according to any one of the preceding items, wherein the cereal is barley.

34. The method according to item 33, wherein the barley is a hull-less barley or a barley variety having a thin husk.
35. The method according to any one of items 1 to 32, wherein the cereal is a hull-less cereal, for example wheat or a hull-less barley.
36. The method according to any one of items 1 to 33, wherein the cereal is a hulled cereal, such as a hulled barley.
37. The method according to any one of the preceding items, wherein the cereal is a barley characterized by one or more of the following:
   A. Carrying a mutation in the gene encoding a β-glucan synthase
   B. Carrying a mutation in the gene encoding LOX-1
   C. Carrying a mutation in the gene encoding LOX-2
   D. Carrying a mutation in the gene encoding MMT; and/or
   E. Carrying a mutation in the gene encoding DELLA
38. The method according to any one of the preceding items, wherein the germinated grains have an α-amylase activity of at least 4 U/g, preferably at least 30 U/g cereal grain on a dry weight basis.
39. The method according to any one of the preceding items, wherein the germinated grains have an α-amylase activity of at least 100 U/g cereal grain on a dry weight basis.
40. The method according to any one of the preceding items, wherein the germinated grains have a β-amylase activity of at least 5 U/g cereal grain on a dry weight basis.
41. The method according to any one of the preceding items, wherein the germinated grains have a limit dextrinase activity of at least 5 mU/g grain on a dry weight basis.
42. The method according to any one of the preceding items, wherein the germinated grains contains at the most 4 g rootlets (dry matter) per 100 g germinated cereal grains (dry matter).
43. The method according to any one of the preceding items, wherein the germinated grains contains at the most 2 g rootlets (dry matter) per 100 g germinated cereal grains (dry matter).
44. The method according to any one of the preceding items, wherein the germinated grains immediately prior to the step of finely dividing them have a content of nitroamines of at the most 0.15 µg/kg, preferably at the most 0.12 µg/kg, for example at the most 0.10 µg/kg cereal grains (dry matter).
45. The method according to any one of the preceding items, wherein step C. comprises mashing said milled germinated grains with a mashing solution at a temperature in the range of 50 to 80° C.
46. The method according to item 45, wherein said mashing is performed in the presence of one or more added hydrolytic enzyme(s).
47. The method according to item 46, wherein at least one hydrolytic enzyme is selected from the group consisting of cell wall- and starch-degrading enzymes, including, but not limited to, α-amylase, β-amylase, limit dextrinase, pullulanase, β-glucanase, xylanase, glucoamylase and protease.
48. The method according to item 45, wherein said mashing is performed in the presence of at least one β-glucanase and at least one xylanase.
49. The method according to any one of items 45 to 48, wherein at the most 700 U, preferably at the most 350 U exogenous glucoamylase and/or α-amylase per g germinated cereal grains (dry weight) is added during said mashing.
50. The method according to any one of items 45 to 49, wherein at the most 100 PUN exogenous pullulanase per g germinated cereal grains (dry weight) is added during said mashing.
51. The method according to any one of items 45 to 46 and 49 to 50, wherein the cereal is characterized by a low β-glucan level in the grains, and wherein no β-glucanase is added during mashing.
52. The method according to any one of the preceding items, wherein the method further comprises a step of filtering said aqueous extract.
53. The method according to any one of the preceding items, wherein the aqueous extract has a filterability of at least 50%, such as of at least 60%.
54. The method according to any one of the preceding items, wherein the aqueous extract comprises at the most 200 mg/L β-glucan.
55. The method according to any one of the preceding items, wherein the aqueous extract comprises at least 10 g, such as at least 15 g maltose per L.
56. The method according to any one of the preceding items, wherein the aqueous extract comprises in the range of 150 to 400 mg/L FAN.
57. The method according to any one of the preceding items, wherein the aqueous extract comprises at least 60 mg/L, preferably at least 65 mg/L valine.
58. The method according to any one of the preceding items, wherein the method does not comprise a step of kiln drying.
59. A method for producing a beverage, said method comprising the steps of:
   i. preparing an aqueous extract by the method according to any one of the preceding items;
   ii. processing said extract into a beverage.
60. The method according to item 59, wherein step ii. comprises the steps of:
   a. heating said aqueous extract optionally in the presence of hops or hops extract;
   b. cooling the aqueous extract;
   c. fermenting said aqueous extract with yeast, thereby producing a fermented beverage.
61. The method according to item 60, wherein the method further comprises a step of sedimentation performed after step a. or step b.
62. The method according to any one of of the preceding items, wherein the entire method is performed at one site.
63. The method according to any one of items 59 to 62, wherein the beverage comprises at the most 25, such as at the most 20 ppb diacetyl.

EXAMPLES

The invention is further illustrated by the following examples. These, however, should not be considered as limiting for the invention. The barley samples used in the examples herein below were all analysed as follows:

Germination Test

All barley samples used in the examples were evaluated for the parameters germination index, germination energy and water sensitivity. Data was based on a sample size of 100 barley grains for a 4-mL germination test and a sample size of 100 barley grains for a 8-mL germination test according to Analytica-EBC Method 3.6.2 Germinative Energy of Barley (BRF Method).

Characterization of Barley Samples

Thousand kernel weights were determined by automatic counting using a Data Count JR instrument, while size fractionation utilized a Pfeuffer Sortimat K3 adjusted to 4 classes of different grain with (X): X>2.8 mm; 2.8<X>2.5 mm; 2.5<X>2.2 mm; X<2.2 mm. Size fractionation data was calculated based on 100-g grain samples.

Protein, water and starch contents of barley samples were determined using a Foss 1241 NIT instrument, using barley calibration (FOSS BY213271; provided by Foss, D K). Prior (e.g. 24 h) to incubation in aqueous solution, the water content of the 100-g grain samples were re-determined using a Foss 1241 NIT instrument using barley calibration Foss BY303300 (Foss, Denmark).

The water content of grain was determined by first measuring the weight of the corresponding barley sample, followed by drying said sample and determining the weight of the dried sample. The difference in weight of the wet and dry sample is considered to be water, and the water content equals the weight of the water divided by the total weight of the sample (wet sample).

Analysis of Germinated Grains

Samples of germinated grains were tested for the following parameters (w/w): water content, protein content, soluble protein and extract of the malt sample. Values were determined using a Foss 1241 NIT instrument calibrated according to data provided by Foss (DK; calibration MA000010).

Example 1. Single-Step Steeping and Germination

In the laboratory-scale experiments, 1 kg of dry barley grain was placed in a Plexiglass cylinder and constantly aerated with atmospheric air from beneath the column of grain. A schematic drawing of the equipment used is provided herein in FIG. 8. The grain was aerated from beneath with varying levels of atmospheric air for different time period, during which the grain moisture content raised as shown in Table 1 and germination is initiated. Different barley varieties, as indicated in the figure legend were used in this analysis. Airflow was set using a SmartTrak® 50 mass flow meter and controller (Sierra, CA, USA) and temperature was measured using a Testo 735 precision thermometer (Testo, Germany).

Sensors for measuring airflow, temperature, pH, conductivity, redox potential and $O_2$ content of the steeping water were incorporated in this system. The sensors allow not only the process to be monitored in real time, but also to adjust steeping and germination conditions during the processes; this level of control is not possible by following current malting and brewing protocols.

Figure 2A:
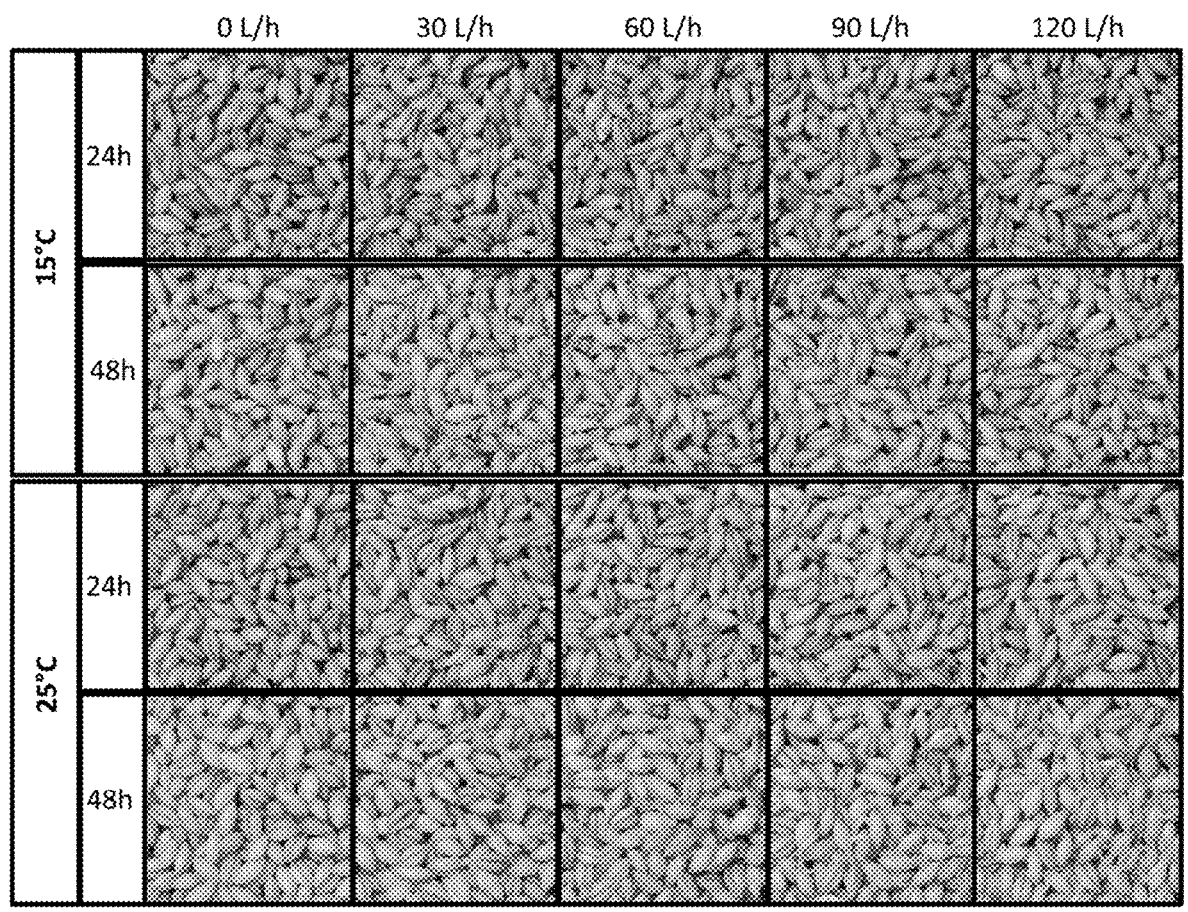
FIGS. 2A-2B show hull-less barley grains after incubation in water at 15° C. or 25° C. for either 24 h or 48 h under the indicated airflow.
Figure 2B:
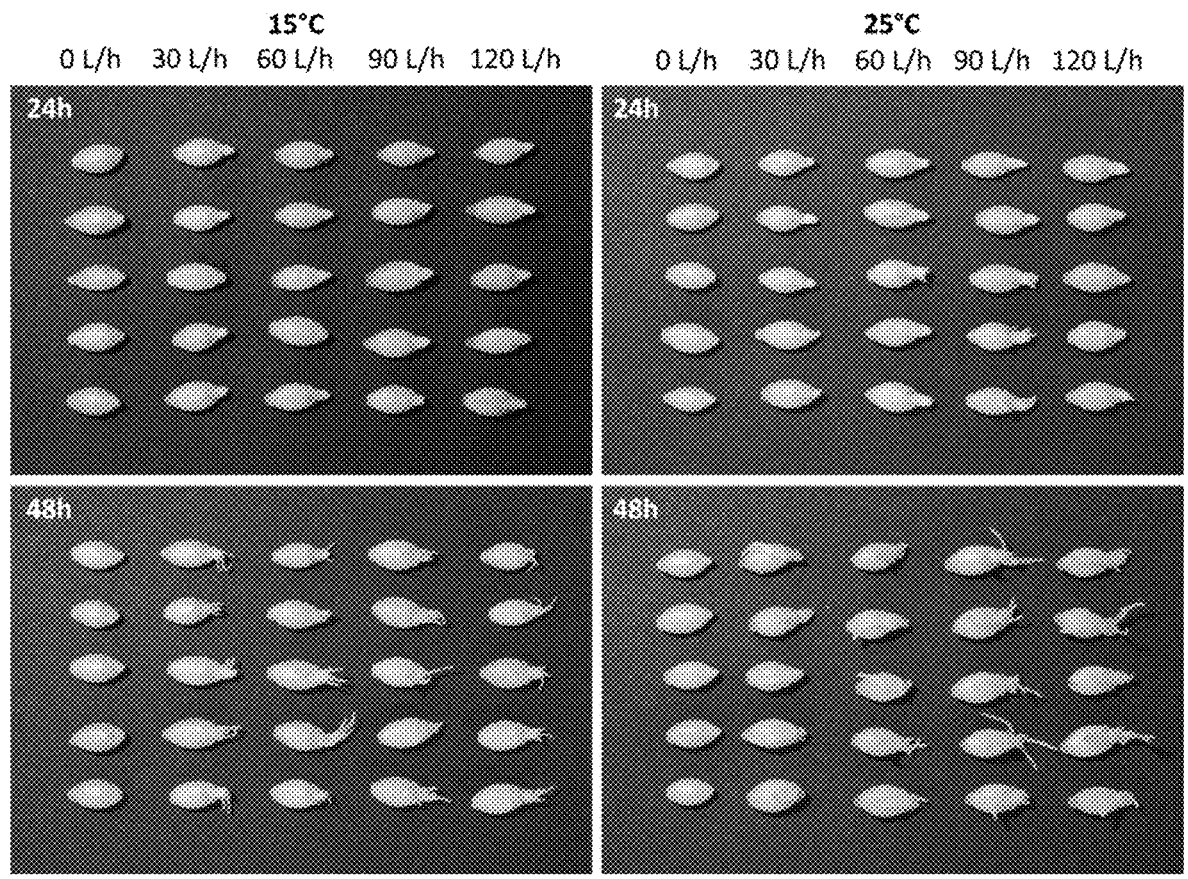

Grains of the a hull-less barley line were transferred to the Plexiglas cylinder and first incubated for 3 h in 1% P3-hypochloran (Ecolab, Switzerland) following incubation for 45 h in water adjusted to 1 nM gibberellic acid (GA) and 0.01% Foamazol FCD511 (AB Vickers, Burton on Trent, UK). Incubation was at either 15 or 25° C., and the grains were aerated with either 30, 60, 90 or 120 L/h atmospheric air. Samples were collected after 24 h and 48 h. The results are summarised in FIGS. 2A-2B. As shown air access strongly promoted barley germination. When comparing to the non-aerated sample (0 L/hr) all samples subjected to an airflow were characterised by a notable difference in grain development. In particular, the grains had a visible chit of more than 1 mm even after 24 h, at 15° C. and 30 L/h airflow. Increasing the airflow caused additional chit development after 24 h at 15° C. At 25° C. some grains even developed visible rootlets (60, 90 or 120 L/h). Increasing the incubation time lead to advance in development, with all grains subjected to airflow characterised by germination and development of visible rootlets after 48 h. With increased incubation temperature, there was enhanced development of chits and rootlets. An airflow of 90 L/h corresponds to 51 g $O_2$ per h. If calculated as $O_2$ per L $H_2O$, the amount will vary over time, because the cereal grains take up water during incubation. Typically, an airflow of 90 L/h corresponds to 64-121 g $O_2$ per L $H_2O$ per h.

Figure 3A:
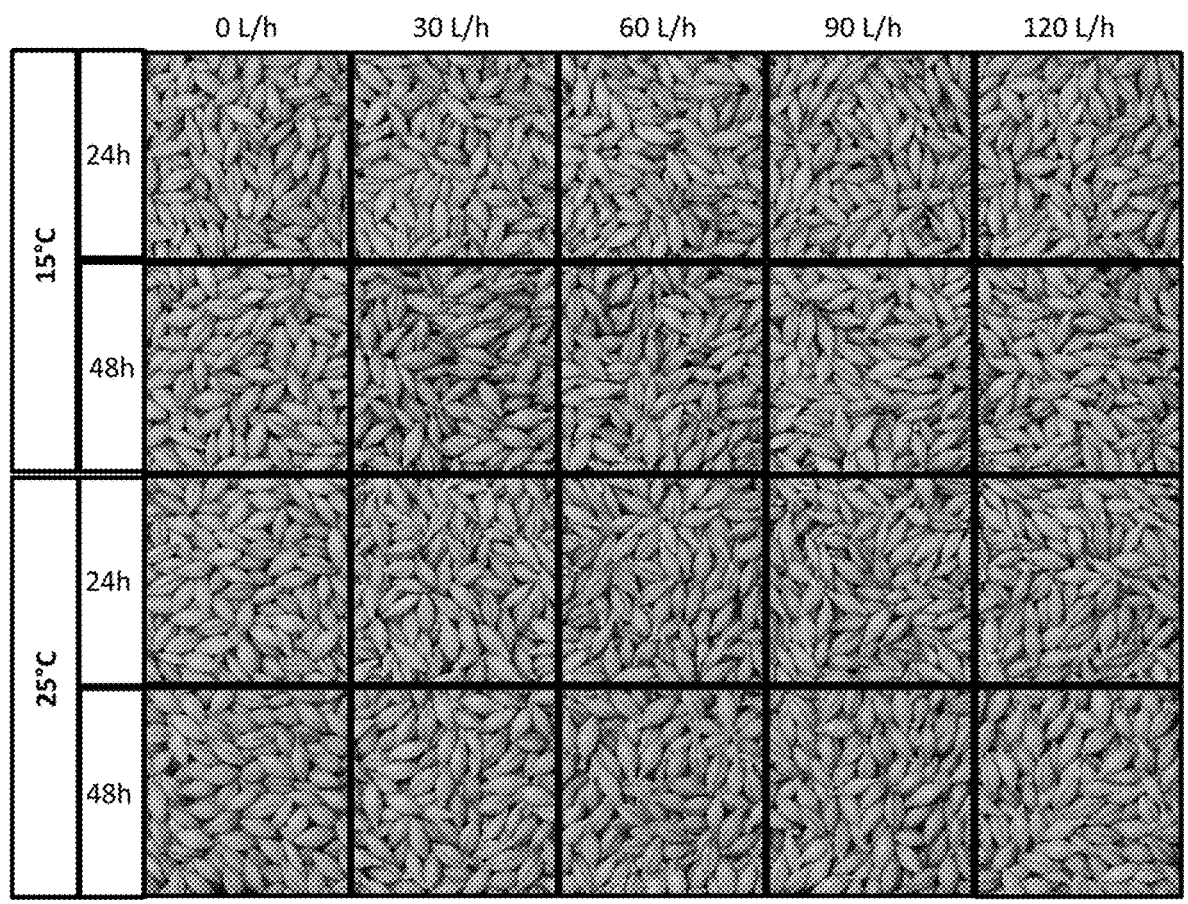
FIGS. 3A-3B show hulled barley grains after incubation in water at 15° C. or 25° C. for either 24 h or 48 h under the indicated airflow.
Figure 3B:
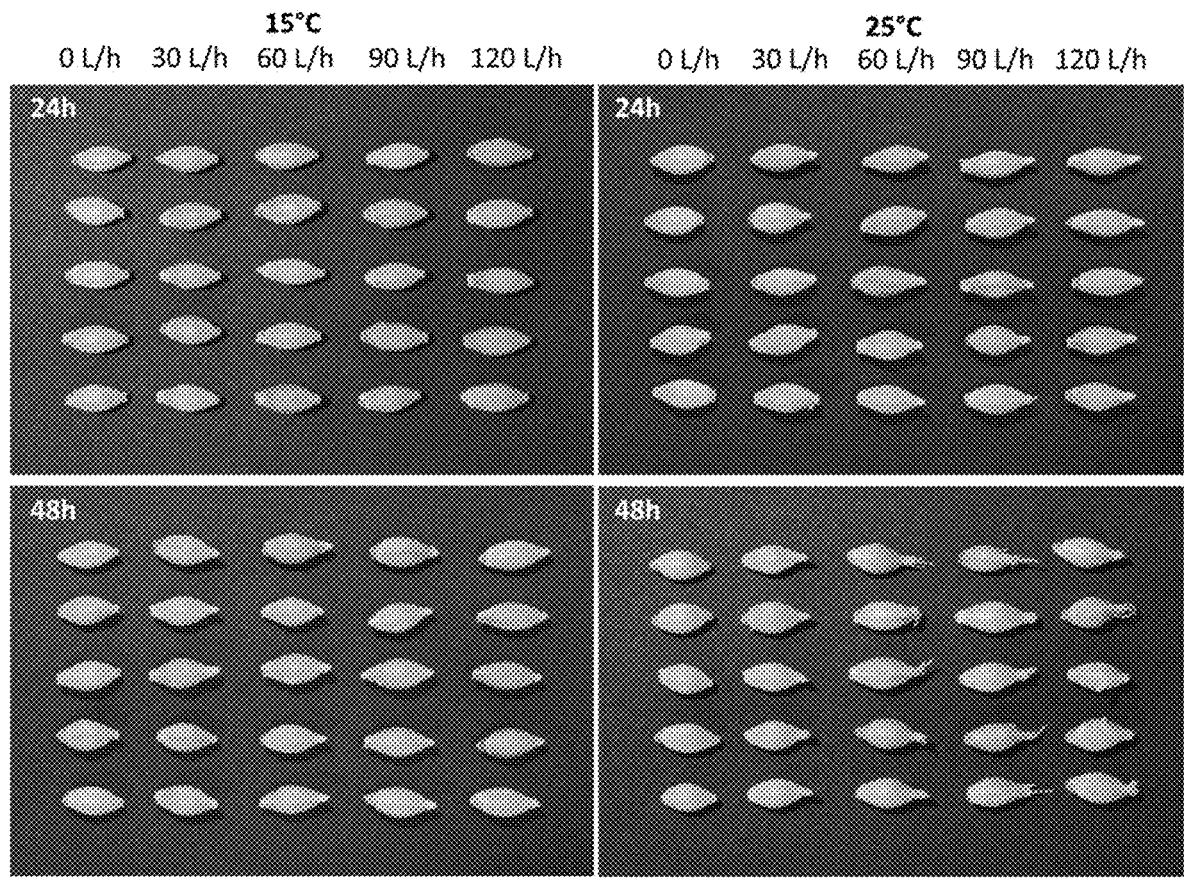

The same experiment was performed using grains of a hulled barley line and the results are summarised in FIGS. 3A-3B. Grains of the hulled barley line also had a visible chit of more than 1 mm after incubation at 24 h, at 25° C. and 30 L/h airflow. Increasing the incubation time lead to advance in development with all grains subjected to airflow of 60 L/h characterised by germination and development of visible rootlets after 48 h.

The water uptake in grains was asserted by determining the water content as % (w/w) in a hull-less barley line and in a hulled barley line, at 15° C. and 25° C. as described above. The results are summarised in Table 1 (hull-less barley) and Table 2 (hulled barley) below. The water content seems not to be highly dependent on the airflow, if the airflow is at least 30 L/h. In contrast, the water content was much higher after 24 h at 25° C. than at 15° C.

TABLE 1

Water uptake (%), hull-less barley grains

| Air flow | Temp. (T) = 15° C. | | | T = 25° C. | | |
| --- | --- | --- | --- | --- | --- | --- |
| | 0 h | 24 h | 48 h | 0 h | 24 h | 48 h |
| 0 L/h | 11.4 | 31.7 ± 0.6 | 37.1 ± 1.4 | 11.4 | 36.7 ± 1.3 | 43.3 ± 0.9 |
| 30 L/h | 11.4 | 35.5 ± 1.5 | 41.5 ± 1.8 | 11.4 | 40.6 ± 0.5 | 46.0 ± 0.1 |
| 60 L/h | 11.4 | 35.1 ± 1.0 | 42.0 ± 1.2 | 11.4 | 38.9 ± 0.1 | 46.5 ± 0.6 |
| 90 L/h | 11.4 | 34.3 ± 0.9 | 42.6 ± 1.4 | 11.4 | 38.3 ± 1.7 | 45.7 ± 0.5 |
| 120 L/h | 11.4 | 35.5 ± 0.8 | 43.2 ± 1.1 | 11.4 | 38.2 ± 2.2 | 44.9 ± 0.6 |

TABLE 2

Water uptake (%), hulled barley grains

| Air flow | Temp. (T) = 15° C. | | | T = 25° C. | | |
| --- | --- | --- | --- | --- | --- | --- |
| | 0 h | 24 h | 48 h | 0 h | 24 h | 48 h |
| 0 L/h | 13.6 | 32.5 ± 0.7 | 36.5 ± 0.3 | 13.6 | 38.3 ± 0.6 | 42.6 ± 0.7 |
| 30 L/h | 13.6 | 33.4 ± 0.3 | 39.0 ± 0.4 | 13.6 | 39.3 ± 0.2 | 46.7 ± 0.6 |
| 60 L/h | 13.6 | 32.9 ± 0.7 | 39.4 ± 0.6 | 13.6 | 39.7 ± 1.2 | 47.9 ± 0.2 |
| 90 L/h | 13.6 | 34.1 ± 0.3 | 38.5 ± 0.2 | 13.6 | 40.3 ± 0.4 | 47.2 ± 0.5 |
| 120 L/h | 13.6 | 33.3 ± 0.5 | 39.0 ± 0.4 | 13.6 | 40.1 ± 0.3 | 47.3 ± 0.8 |

Accordingly, results of the present invention show that a temperature of 25° C. may be more preferable for early rates of water uptake by the grain and hence in the overall speed of the germination.

Example 2. Enzyme Activity

During germination, the barley grain begins to secrete a range of hydrolytic enzymes, such as α-amylases, limit dextrinases and (1,3;1,4)-β-glucanases. Typically, these enzyme activities are detected in a timely coordinated manner, with the activities of α-amylase, β-amylase and/or limit dextrinase useful as a general marker for activity of hydrolytic enzymes. Thus, the activities of α-amylase and limit dextrinase were determined after germination performed according to the method of the invention.

GA is a phytohormone that activates the aleurone layer in germinating barley. Many maltsters add GA at low concentration during the malting process. Here, various concentrations of GA supplemented to the water for incubation of the grains at the start of the process. A $GA_3$ solution was prepared from gibberellic acid (G7645, Sigma-Aldrich, St. Louis, MO, USA) in absolute ethanol and added to the water. The enzyme activities were monitored by measuring hydrolytic enzyme activities in grain extracts at 24 hr and 48 hr.

Sample Preparation

Prior to enzyme activity analysis the germinated grain samples were milled using a standard Foss Cyclotech mill (Foss, Denmark), equipped with a tungsten carbide grinding ring (Foss 10004463), nickel plated impeller (Foss 1000 2666) and a 1 mm outlet screen (Foss 10001989). All measurements of enzyme activity in germinated barley grains were made within 48 h after milling of the sample.

α-Amylase Activity

α-Amylase activity of germinated grains was based on flour prepared as described above in the section "Sample preparation". Assays for determination of α-amylase activity utilized a Ceralpha kit kit from Megazyme using standard laboratory equipment. The assays were made according to manufacturer's protocol (K-CERA 01/12), including calculation of α-amylase activity.

β-Amylase Activity

When measuring beta-amylase activity of germinated grains, flour was made as described above in the section "Sample preparation". 3-Amylase activity assays followed the recommendations provided with the the Betamyl kit from Megazyme (K-BETA3).

Limit Dextrinase Activity:

For measurement of limit dextrinase activity in germinated grains, flour was made as described above in the section "Sample preparation". Limit dextrinase activity was determined using a Limit Dextrizyme kit T-LDZ1000 from Megazyme. Assays, including activity measurements, were done according to manufacturer's protocol (T-LDZ1000 07/9).

α-Amylase, β-amylase and limit dextrinase activities were determined in a hull-less barley line. The barley grains were germinated essentially as described in Example 1 by incubation in water in the presence of 0.01% FCD511 Foamzol and varying amounts of GA under aeration. Airflow was set to 90 L/h using a SmartTrak® 50 mass flow meter and controller (Sierra, CA, USA) without sanitation at 25° C. (measured using a Testo 735 precision thermometer, Testo, Germany). The enzyme activities in the germinated grains were measured at 24 and 48 h after imbition, with the results shown in FIGS. 4A-4C.

In addition, α-amylase, β-amylase and limit dextrinase activities were determined in both a hull-less barley line and a hulled barley line. The barley grains were germinated essentially as described in Example 1 by incubation in water in the presence of 0.01% FCD511 Foamzol and 1000 nM GA under aeration. Varying airflow was used as indicated in Tables 3 and 4 below using a SmartTrak® 50 mass flow meter and controller (Sierra, CA, USA) without sanitation at 25° C. (measured using a Testo 735 precision thermometer, Testo, Germany). The enzyme activities in the germinated grains were measured at 24 and 48 h, with the results shown in Table 3 (hull-less barley) and Table 4 (hulled barley).

TABLE 3

Enzyme activities in grains of hull-less barley.

| Air flow | | Temperature (T) = 15° C. | | | T = 25° C. | | |
|---|---|---|---|---|---|---|---|
| | | 0 h | 24 h | 48 h | 0 h | 24 h | 48 h |
| 0 L/h | α*) | 1.1 ± 0.2 | 0.2 ± 0.2 | n.d. | 1.1 ± 0.2 | n.d. | n.d. |
| | β**) | 18.6 ± 0.3 | 19.4 ± 0.1 | 16.2 ± 2.6 | 18.6 ± 0.3 | 15.8 ± 0.6 | 16.8 ± 1.6 |
| | LD***) | 1.6 ± 2.2 | 0.3 ± 0.4 | 0.4 ± 0.9 | 1.6 ± 2.2 | 1.1 ± 1.6 | 1.4 ± 0.8 |
| 30 L/h | α | 1.1 ± 0.2 | 2.0 ± 0.2 | 13.6 ± 0.1 | 1.1 ± 0.2 | 5.2 ± 0.7 | 33.1 ± 0.6 |
| | β | 18.6 ± 0.3 | 13.8 ± 0.3 | 18.3 ± 1.8 | 18.6 ± 0.3 | 16.3 ± 0.8 | 19.6 ± 0.6 |
| | LD | 1.6 ± 2.2 | 4.6 ± 3.3 | 5.5 ± 0.9 | 1.6 ± 2.2 | 5.2 ± 0.6 | 14.0 ± 3.1 |
| 60 L/h | α | 1.1 ± 0.2 | 0.6 ± 0.1 | 13.4 ± 0.8 | 1.1 ± 0.2 | 5.2 ± 0.1 | 48.3 ± 1.6 |
| | β | 18.6 ± 0.3 | 15.0 ± 1.8 | 18.6 ± 2.1 | 18.6 ± 0.3 | 15.5 ± 2.0 | 16.9 ± 3.7 |
| | LD | 1.6 ± 2.2 | 3.6 ± 0.2 | 7.5 ± 2.9 | 1.6 ± 2.2 | 4.8 ± 1.9 | 19.6 ± 2.5 |
| 90 L/h | α | 1.1 ± 0.2 | 0.6 ± 0.1 | 13.8 ± 0.3 | 1.1 ± 0.2 | 5.2 ± 0.1 | 59.3 ± 2.3 |
| | β | 18.6 ± 0.3 | 16.7 ± 1.6 | 16.9 ± 1.4 | 18.6 ± 0.3 | 15.1 ± 3.6 | 17.7 ± 2.5 |
| | LD | 1.6 ± 2.2 | 1.5 ± 1.4 | 7.5 ± 0.6 | 1.6 ± 2.2 | 4.0 ± 1.6 | 26.0 ± 3.3 |
| 120 L/h | α | 1.1 ± 0.2 | 0.6 ± 0.1 | 12.7 ± 0.7 | 1.1 ± 0.2 | 4.9 ± 0.1 | 59.3 ± 0.9 |
| | β | 18.6 ± 0.3 | 16.9 ± 1.8 | 17.7 ± 1.7 | 18.6 ± 0.3 | 14.6 ± 3.1 | 18.6 ± 3.4 |
| | LD | 1.6 ± 2.2 | 2.1 ± 1.0 | 7.6 ± 0.4 | 1.6 ± 2.2 | 2.0 ± 0.4 | 22.4 ± 0.7 |

*)α-Amylase activity (U/g);

**)β-amylase activity (U/g);

***)activity of free limit dextrinase (mU/g)

TABLE 4

Enzyme activities in grains of hulled barley *).

| Air flow | | Temperature (T) = 15° C. | | | T = 25° C. | |
|---|---|---|---|---|---|---|
| | 0 h | 24 h | 48 h | 0 h | 24 h | 48 h |
| 0 L/h α | n.d. | n.d. | n.d. | n.d. | n.d. | n.d. |
| β | 17.1 ± 0.7 | 19.2 ± 1.7 | 18.2 ± 1.0 | 17.1 ± 0.7 | 12.8 ± 1.4 | 10.7 ± 0.5 |
| LD | n.d. | 2.7 ± 2.6 | n.d. | n.d. | 1.6 ± 2.2 | 1.6 ± 0.2 |
| 30 L/h α | n.d. | n.d. | n.d. | n.d. | n.d. | 1.9 ± 2.7 |
| β | 17.1 ± 0.7 | 17.3 ± 1.7 | 11 ± 2.7 | 17.1 ± 0.7 | 12.1 ± 1.4 | 14.5 ± 0.4 |
| LD | n.d. | 2.7 ± 0.6 | n.d. | n.d. | 0.3 ± 0.4 | 2.1 ± 0.6 |
| 60 L/h α | n.d. | n.d. | n.d. | n.d. | n.d. | 4.4 ± 6.2 |
| β | 17.1 ± 0.7 | 18.9 ± 0.5 | 11.0 ± 0.7 | 17.1 ± 0.7 | 9.8 ± 0.9 | 17.5 ± 1.2 |
| LD | n.d. | 0.6 ± 0.8 | n.d. | n.d. | 0 ± 1.8 | 5.1 ± 0.4 |
| 90 L/h α | n.d. | n.d. | n.d. | n.d. | n.d | 4.1 ± 5.8 |
| β | 17.1 ± 0.7 | 18.6 ± 1.0 | 10.3 ± 1.0 | 17.1 ± 0.7 | 9.3 ± 0.6 | 17.2 ± 1.2 |
| LD | n.d. | n.d. | n.d. | n.d. | 0 ± 1.4 | 9.2 ± 2.6 |
| 120 L/h α | n.d. | n.d. | n.d. | n.d. | n.d | 9.3 ± 0.2 |
| β | 17.1 ± 0.7 | 18.6 ± 0.6 | 10.9 ± 1.3 | 17.1 ± 0.7 | 9.2 ± 0.6 | 16.0 ± 1.2 |
| LD | n.d. | n.d. | n.d. | n.d. | 2.4 ± 0.6 | 8.0 ± 2.2 |

*) Abbreviations are identical to those of the legend to Table 3;
n.d. = not determined.

Figure 4A:
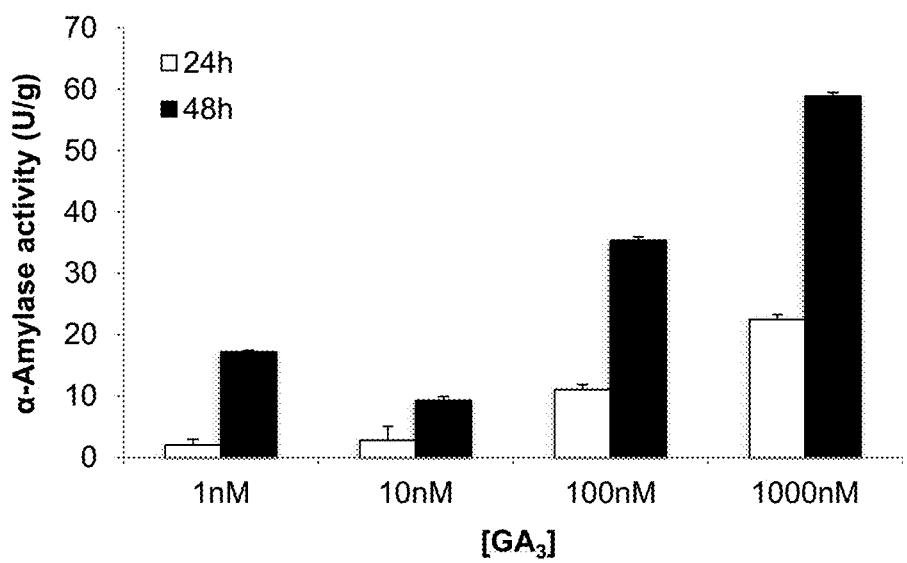
FIGS. 4A-4C show diagrams related to activities of α-amylase (FIG. 4A), β-amylase (FIG. 4B) and limit dextrinase (panel 4C) in grains germinated in the presence of various amounts of GA in water under aeration.
Figure 4B:
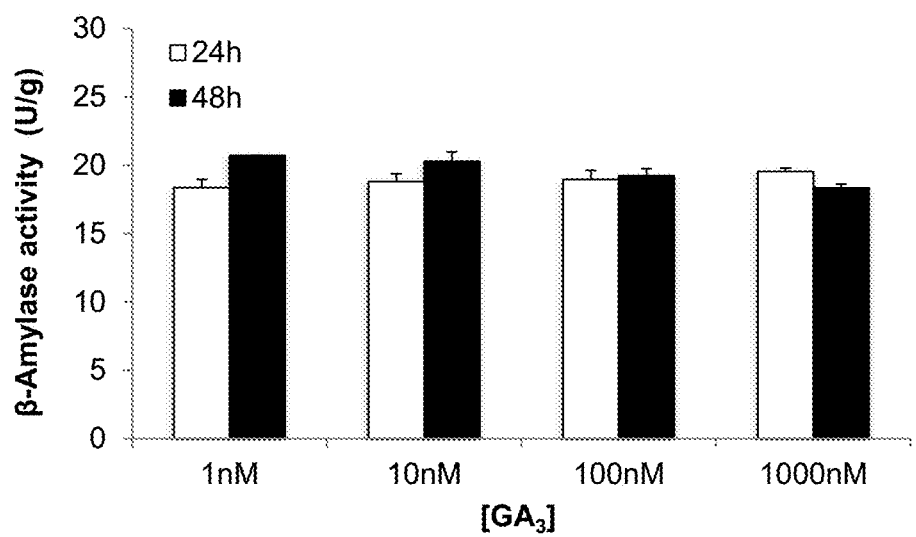
Figure 4C:
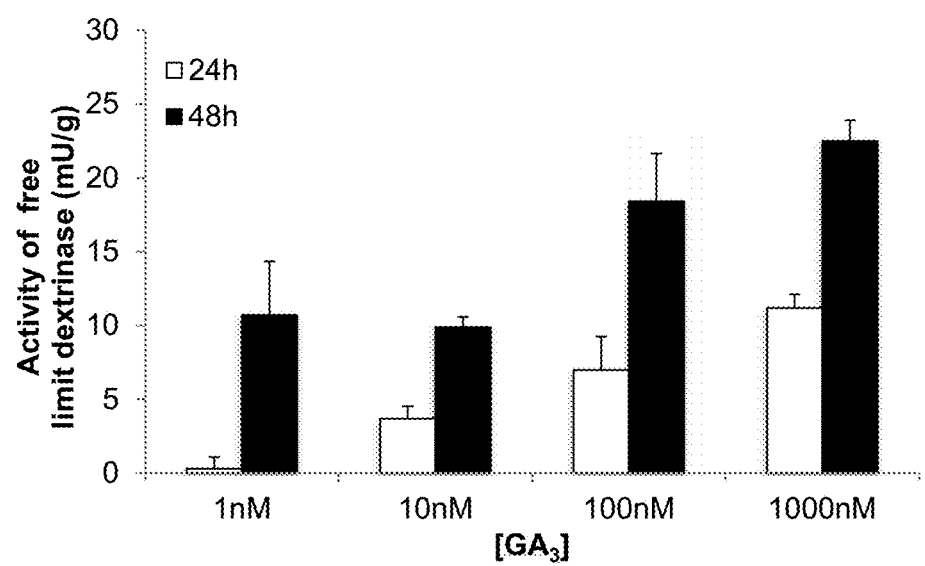

As illustrated in FIGS. 4A-4C, levels of both α-amylase and limit dextrinase increased significantly following addition of GA.

Example 3. Mashing

Barley grains were germinated as described herein above in Example 1. After 2 d of continuous steeping and germination, the liquid phase was drained from the grains and the grain was wet-milled in a laboratory-scale homogenizer (Omega Juicer 8226, Omega, USA). Extraction of the milled grains in water was done using the mashing schedule outlined in FIG. 5. This process may also be referred to as "mashing". During mashing a saccharification in general also occurs. During mashing $CaCl_2$ and $H_3PO_4$ is typically added to the water.

During the process of industrial mashing, exogenous enzyme preparations may be added to continue the conversion of partially degraded starch, storage protein and cell wall polysaccharides to fermentable sugars and amino acid that subsequently support the growth of the yeast during fermentation. Mashing characteristics in the presence and absence of the Ultraflo Max brewing enzyme mixture (Novozymes, Denmark) were compared. Ultraflo Max is an enzyme mixture comprising β-glucanase and xylanase activities. Following mashing, extracts were filtered using a standard mash filter.

The efficacy of the exogenous enzyme mixture was tested by measuring the filterability of the mash mixture that remained after the mashing process. The filterability was determined using a 140-mm TOP ID filter funnel (Urbanti Pequannock, N.J. USA) equipped with MN 614 ¼ Ø 320 mm REF 527032 (Macherey Nagel Duren Germany). The weight of samples were recorded using a standard balance (MPB1502 L, Mettler Toledo, Switzerland). The filterability was determined as the total amount of liquid obtained after filtration for 60 min of a mash mixture comprising 400 mL of mashing solution, previously supplemented with 100 g of milled, germinated barley.

Figure 6:
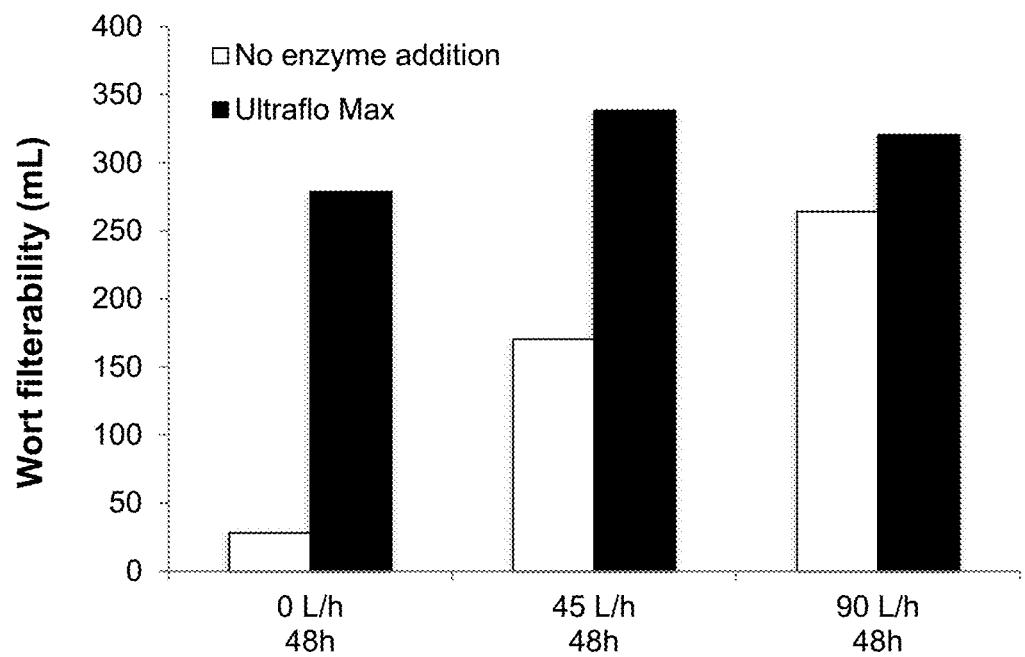
FIG. 6 shows a diagram of the filterability of wort, which had been prepared from grains germinated under varying aeration in the presence or absence of the brewing enzyme mixture Ultraflo Max (UFM).

The experimental results are summarized in FIG. 6 for grains of a hull-less barley line, which was germinated for 48 h at 25° C. with aeration as that described for the experiment detailed in Example 1.

Example 4. Wort

Wort was prepared as detailed in the experiments of Example 3, using germinated barely grains prepared as described in Example 1. The barley grains of a hull-less line were incubated for 48 h at 25° C. in the presence of GA, as described in Example 1, under aeration with atmospheric air at either 45 L/h or 90 L/h. The germinated barley grains were wet-milled and mashed as described in Example 3—either in the presence or absence of the Ultraflo Max enzyme mixture (Novozymes, Denmark).

Figure 7:
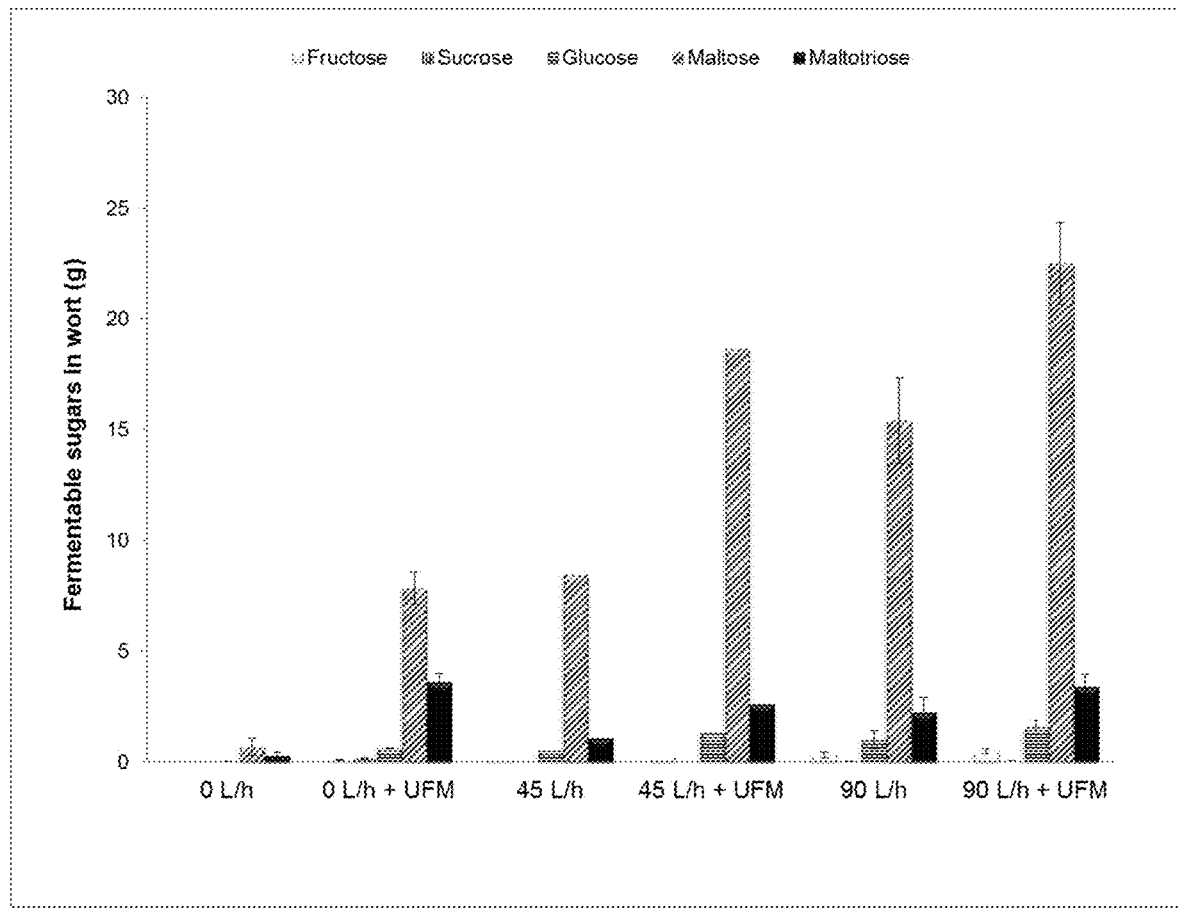
FIG. 7 shows a diagram on the level of fermentable sugars in wort prepared from grains germinated for 48 h at 25° C. under varying aeration conditions. Samples supplemented with the brewing enzyme mixture Ultraflo Max are marked with UFM.

The levels of fermentable sugars—fructose, sucrose, glucose, maltose and maltotriose—were determined in the following manner. After boiling of the wort, it was diluted 1:2000 with milliQ-water and subsequently filtered through a 0.2-μm nylon membrane filter (Titan3 30 mm, Thermo Scientific, CA, USA). Aliquots of 10 μL were first applied to a CarboPac SA10-4 μm column, and subsequently analyzed on a Dionex ICS 5000+Reagent-Free HPLC System equipped with a CarboPac SA10-4 μm Guard Column (4×50 mm). Elution of separated molecules was with an isocratic 25 mM KOH run over 20 min. After baseline subtraction and employing HPLC grade pure carbohydrates as reference standards [D-(+)-glucose, D-fructose, D-(+)-maltose maltotriose], carbohydrates were quantified by peak area integration. The results are shown in FIG. 7.

Example 5

Fermentation

The wort, prepared as described in Example 3, is boiled in the presence of hops or hop extract and the fermentation process is commenced through the conventional inoculation of the extract with an appropriate brewing yeast strain. Fermentation, beer filtration and bottling are performed according to traditional protocols.

Small-Scale Brewing

The example compares beer prepared from two varieties of barley, treated according to the methods described herein with beer prepared from unmalted barley treated with a commercially available brewing enzymes mix. The wort and final beers were analysed and compared to a commercial reference lager beer (denoted "Reference" herein) when possible. The data on the reference lager beer were obtained separately from other sources.

Material

Unless otherwise stated the material was used as is.

|  | Trial 1 | Trial 2 | Trial 3 | Trial 4 | Reference |
|---|---|---|---|---|---|
| Barley Variety | Hull-less 01 | Hulled 02 | Hulled 02 | Hull-less 01 | 80% malt 20% barley |
| Treatment prior to milling | at 90 L/h air 24 h WA 24 h A | at 90 L/h air 24 h WA 24 h A | — | — | Malt prepared by standard procedure |

Milling

| Treated material | Untreated material |
|---|---|
| Milled on a household juicer (Omega J822C) | Milled on MULTICRACKER |

Brewing

Brewing was done under standard conditions using a grits/water ratio of 1 to 4.

|  | Treated material (trial 1 and 2) | Untreated material (trial 3) | Untreated material (trial 4) | Reference |
|---|---|---|---|---|
| pH | 5.20 | 5.70 | 5.70 | Typically 5.20 |
| Enzyme addition | Ultraflo ® Max, 0.2 g/kg DM Attenuzyme ® Flex, 1.0 g/kg DM | OndeaPro ®, 2.0 g/kg DM | OndeaPro ®, 2.0 g/kg DM | Ultraflo ® Max, 0.08 g/kg DM Attenuzyme ® Core, 0.2 g/kg DM |

The germinated barley, the untreated material and/or the malt was mashed in using a standard mashing programme with a 2 step saccharification in the presence of the indicated enzymes.

Ultraflo® Max, Attenuzyme® Flex, Attenuzyme® Core and OndeaPro® are available from Novozymes, Denmark. According to manufacturer:

Ultraflo® Max comprises β-glucanase (700 EGU/g) and xylanase (250 FXU/g)

Attenuzyme® Flex comprises glucoamylase (400 AGU/g) and pullulanase (80 PUN/g) according to product sheet from manufacturer Attenuzyme® Core comprises glucoamylase (1600 AGU/g)

OndeaPro® comprises β-glucanase, Xylanase, α-amylase, Pullulanase (637 PUN/g), Protease and Lipase.

When determining the activity of Attenuzyme® Flex as described in Example 2 it was found that an amount of Attenuzyme® Flex was used corresponding to 16243 mU barley limit dextrinase activity per g enzyme solution. Furthermore, it was found that the combined glucoamylase and α-amylase activity was 628,863 U per g enzyme solution.

The cold wort was collected after standard lautering and and wort boiling with hops added at the start of boiling.

The original extract was adjusted with tap water to achieve a final plato (in % P) of 11.5 after boiling and evaporation and the colour of wort was adjusted to achieve a colour similar to the colour of the reference beer.

Fermentation

Brewers Clarex® (available from DSM) was added to the cold wort at 0.1 g/kg DM wort was pitched with 8E6 cells/ml of lager yeast (*S. pastorianus*), pitched wort was aerated with air for 30 min fermentation was carried out in a pressure-less fermentation tank at 15° C. until end of fermentation end-fermented beer was kept at 4° C. until transfer to a tank Transfer to Tank beer with less than 5E5 cells/mlin suspension was transferred to a tank the tank was flushed with $CO_2$ to 0.5 bar before and after filling $CO_2$ was added to an overpressure of 0.5 bar and beer was kept at 4° C. until filtration Filtration beer was filtered through three layers of depth filter sheets 1.2 bar of $CO_2$ pressure were applied to beer in the tank after filtration beer was kept at 4° C. until packaging Packaging The beer was packaged in 33 cl bottles and kept at 4° C. for final tests and sensory evaluation. Analysis results Sugars in Wort Before Fermentation The concentration of total fermentable sugars was determined essentially as described in Example 4 and the results are shown in Table 5. The glucose levels are noticeably higher in both brews prepared according to the methods of the invention compared to the brew prepared from unmalted barley.

TABLE 5

|  | Trial 1 | | Trial 2 | | Trial 3 | | Trial 4 | | Reference | |
| --- | --- | --- | --- | --- | --- | --- | --- | --- | --- | --- |
|  | g/100 g/% P wort | % | g/100 g/% P wort | % | g/100 g/% P wort | % | g/100 g/% P wort | % | g/100 g/% P wort | % |
| Sucrose | 0.008 | 1.9 | 0.016 | 1.8 | 0.019 | 2.5 | 0.021 | 2.2 | 0.024 | 3.3 |
| Glucose | 0.202 | 47.4 | 0.497 | 56.3 | 0.054 | 7.1 | 0.046 | 4.8 | 0.333 | 46.1 |
| Fructose | 0.012 | 2.8 | 0.014 | 1.5 | 0 | 0.0 | 0.013 |  | 0.016 | 2.2 |
| Maltose | 0.193 | 45.3 | 0.338 | 38.3 | 0.533 | 70.8 | 0.651 | 68.7 | 0.312 | 43.2 |
| Maltotriose | 0.011 | 2.6 | 0.017 | 1.9 | 0.147 | 19.5 | 0.217 | 22.9 | 0.037 | 5.1 |

Free Amino Nitrogen and β-Glucan

The concentration of free amino nitrogen (FAN) in the wort prior to fermentation as well as in the final beer were determined according to the ThermoFisher, Gallary Beermaster standard protocol for FAN, Colorimetric method. Typical values of free amino nitrogen (FAN) in wort are 200 mg/L. FAN is important for good yeast viability during fermentation. In general, FAN levels which are high enough to obtain good yeast viability are desirable. The results re FAN in wort before fermentation is shown in Table 6a and in beer in Table 6b.

β-glucan is usually degraded during conventional malting. Too high levels of β-glucan is undesirable, because this may cause problematic filtration. The level of β-glucan in wort prior to fermentation as well as in beer were determined using the "Beta-Glucan (High MW)" kit from Thermo Scientific according to manufacturer's instructions and the results are shown in Table 6a (wort prior to fermentation) and Table 6b (beer).

TABLE 6a

Wort prior to fermentation

| mg/L | Trial 1 | Trial 2 | Trial 3 | Trial 4 | Reference |
| --- | --- | --- | --- | --- | --- |
| FAN | 265 | 177 | 104 | 118 | 219 |
| beta-glucan | 143 | 107 | 86 | 151 | 73 |

TABLE 6b beer

| mg/L | Trial 1 | Trial 2 | Trial 3 | Trial 4 | Reference |
| --- | --- | --- | --- | --- | --- |
| FAN | 116 | 36 | 50 | 55 | 104 |
| beta-glucan | 60 | 50 | 44 | 58 | 46 |

Amino Acids in Wort Before Fermentation

The concentration of all standard amino acids in the wort prior to fermentation were determined using Waters AccQTag Ultra kit following the procedure described therein. The result on amino acids in wort before fermentation are shown in Table 7.

In particular the concentration of valine before fermentation is important. The more valine is present in the wort, the lower is the likelihood of "undesired Diacetyl" formation during fermentation—and thereby longer DA resting time. Valine concentration is 5-fold (Trial 1) and 2-fold (Trial 2) higher in wort prepared according to the invention compared to Trial 3.

TABLE 7

| mg/L wort | Trial 1 | Trial 2 | Trial 3 | Trial 4 | Reference |
| --- | --- | --- | --- | --- | --- |
| Histidine | 20 | 30 | 17 | 23 | 56 |
| Asparagine | 119 | 82 | 77 | 100 |  |
| Serine | 8 | 44 | 26 | 43 | 67 |
| Glutamine | 79 | 45 | 10 | 16 |  |
| Arginine | 92 | 92 | 59 | 77 | 144 |
| Glycine | 58 | 34 | 18 | 21 | 36 |
| Aspartic acid | 9 | 54 | 45 | 53 | 79 |
| Glutamic acid | 87 | 58 | 36 | 67 | 72 |
| Threonine | 81 | 44 | 26 | 33 | 77 |
| Alanine | 193 | 103 | 45 | 58 | 113 |
| Proline | 317 | 105 | 38 | 70 |  |
| Cysteine | 0 | 4 | 0 | 0 |  |
| Lysine | 113 | 77 | 51 | 59 | 104 |
| Tyrosine | 94 | 56 | 36 | 45 | 116 |
| Methionine | 37 | 24 | 17 | 21 | 42 |
| Valine | 153 | 71 | 31 | 50 | 132 |
| Isoleucine | 80 | 43 | 16 | 28 | 79 |
| Leucine | 214 | 109 | 52 | 69 | 181 |
| Phenylalanine | 139 | 75 | 39 | 47 | 144 |
| Tryptophane | 47 | 32 | 25 | 30 |  |
| Total amino acids | 1960 | 1212 | 681 | 907 |  |

Various brewing and fermentation key number were determined and compared to the reference. The results are shown in Table 8. It is notable that beers prepared by the methods of the invention had significantly lower diacetyl levels. It is generally preferred that the diacetyl levels are as low as possible.

TABLE 8

|  | Trial 1 | Trial 2 | Trial 3 | Trial 4 | Reference |
| --- | --- | --- | --- | --- | --- |
| Original extract, % P | 11.4 | 11.5 | 11.7 | 11.5 | 10.1 |
| RDF, % | 70.8 | 70.5 | 74.9 | 72.5 | 70.3 |
| pH | 4.06 | 3.90 | 4.21 | 4.15 | 4.25 |
| Alcohol, vol % | 5.2 | 5.2 | 5.6 | 5.4 | 4.54 |
| Colour, EBC units | 5.4 | 8.0 | 5.4 | 7.1 | 6.4 |
| Bitterness | 14 | 14 | 16 | 18 | 16 |
| Diacetyl, ppb | 14 | 15 | 27 | 28 | 22 |
| $SO_2$, mg/L | 1 | 1 | 1 | 1 | 3 |

Sensory Panel Evaluation

All the beers prepared as described in this Example were subjected to evaluation by a sensory panel. The total flavour score for all of them was acceptable. One difference between the different beers was that the beer from Trial 3 had the score "noticeably" for the flavour "soapy, fatty, diacetyl, oily rancid", whereas the beer from Trial 2 (prepared according to the invention) only had the score "slightly" for this flavour.

Example 6

Steeping of Wheat:

4 commercially available wheat varieties (1-Benchmark, 2-Creator, 3-Pistoria, 4-Sheriff) were sanitized for 1 h in 0.1% hypochloran, then steeped and germinated by incubation in a tank for 24 h or 48 h in tap water containing 1000 nM GA3 and 0.01% antifoam agent (Sigma 204). The incubation was performed at 25° C., and 90 l/h air was lead through the water from the bottom of the tank during the entire incubation.

Figure 9:
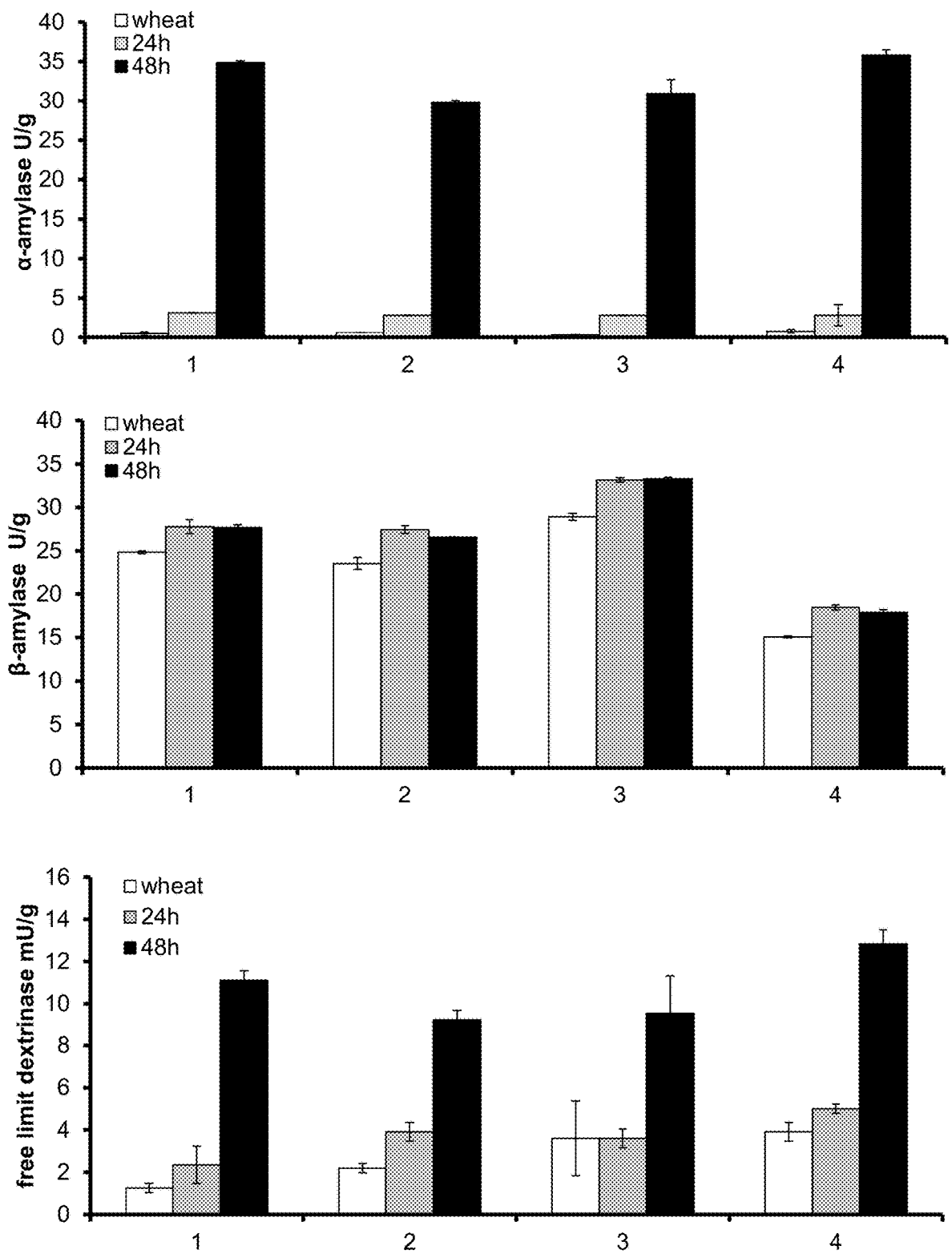
FIG. 9 shows α-amylase, β-amylase and limit dextrinase activity in 4 commercially available wheat varieties 1—Benchmark, 2—Creator, 3—Pistoria, 4—Sheriff in wheat (white columns), after 24 h (grey columns) or 48 h (black columns).

After incubation the α-amylase, β-amylase and limit dextrinase activity was determined essentially as described in Example 2. The results are shown in FIG. 9. After 48 h incubation the α-amylase and the limit dextrinase activity is significantly increased.

Example 7

Steeping of Hulled Barley:

8 commercially available barley varieties (1—Alexis, 2—Chief, 3—Chill, 4—Paustian, 5—Planet, 6—Prestige, 7—Quench, 8—Tipple) were sanitized for 1 h in 0.1% hypochloran, then steeped and germinated by incubation in a tank for 24 h or 48 h in tap water containing 1000 nM GA3 and 0.01% antifoam agent (Sigma 204). The incubation was performed at 25° C., and 90 l/h air was lead through the water from the bottom of the tank during the entire incubation.

Figure 10:
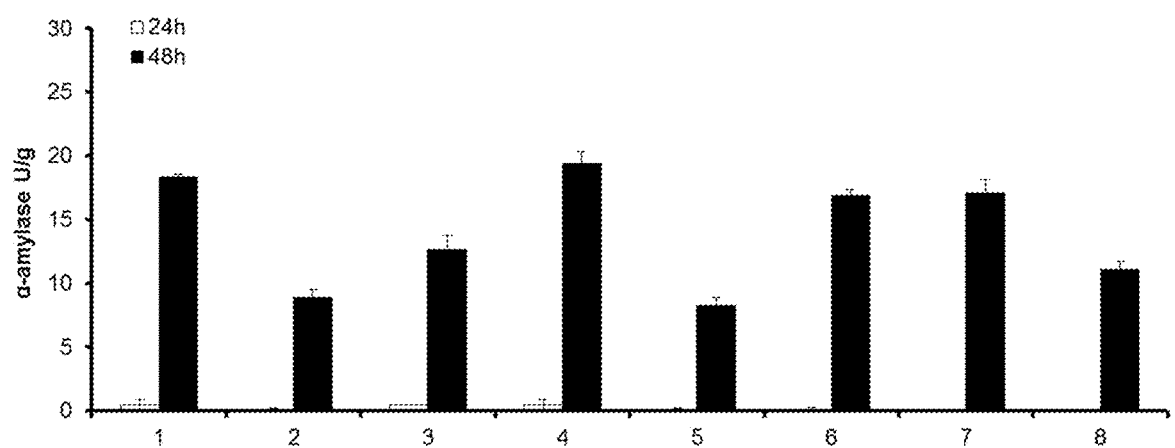
FIG. 10 shows α-amylase in 8 barley varieties after germination under aeration (1—Alexis, 2—Chief, 3—Chill, 4—Paustian, 5—Planet, 6—Prestige, 7—Quench, 8—Tipple)

After incubation the α-amylase activity was determined essentially as described in Example 2. The results are shown in FIG. 10. After 48 h incubation the α-amylase activity is significantly increased.

Example 8

Peeling of Hulled Barley:

Hulled barley (Hulled 02) was peeled by mechanical sandpaper treatment for 1, 2, 4 or 16 minutes in order to partially remove the husk. The treatment resulted in 1, 2, 3 or 5 weight loss. The peeled barley kernels were sanitized for 1 h in 0.1% hypochloran, and steeped and germinated by incubation in a tank for 24 h or 48 h in tap water containing 1000 nM GA3 and 0.01% antifoam agent (Sigma 204). The incubation was performed at 25° C., and 90 l/h air was lead through the water from the bottom of the tank during the entire incubation.

Figure 11:
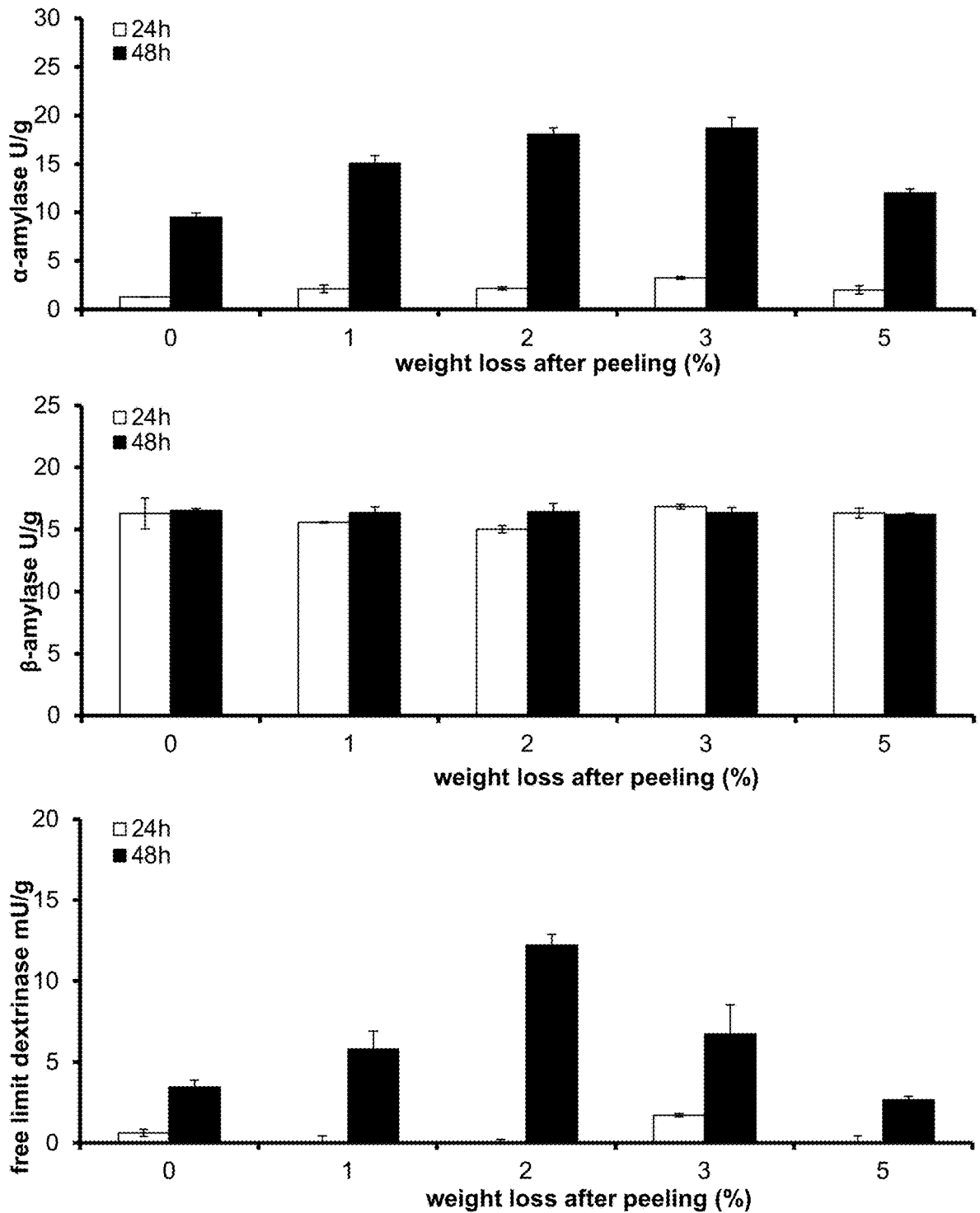
FIG. 11 shows α-amylase, β-amylase and limit dextrinase activity in hulled barley peeled to remove husk and subsequently germinated under aeration.

After incubation the α-amylase, β-amylase and limit dextrinase activity was determined essentially as described in Example 2. The results are shown in FIG. 11. Peeling barley kernels to a weight loss of 2% results in significantly induced α-amylase and limit dextrinase activities.

Example 9

Air Rest on Hull-Less and Hulled Barley:

Hull-less (Hull-less 01) and hulled (Hulled 02) barley were sanitized for 1 h in 0.1% hypochloran, and steeped and germinated according to different steeping regimes.

WA=Water/Air:

Incubation in a tank in tap water containing 1000 nM GA3 and 0.01% antifoam agent (Sigma 204) at 25° C., while 90 l/h air is lead through the water from the bottom of the tank during the entire incubation.

A=Air

Incubation of moist cereal grains in a tank. During the entire incubation 90 l/h air is lead through the moist cereal grains from the bottom of the tank. Incubation performed at 25° C.

Figure 12A:
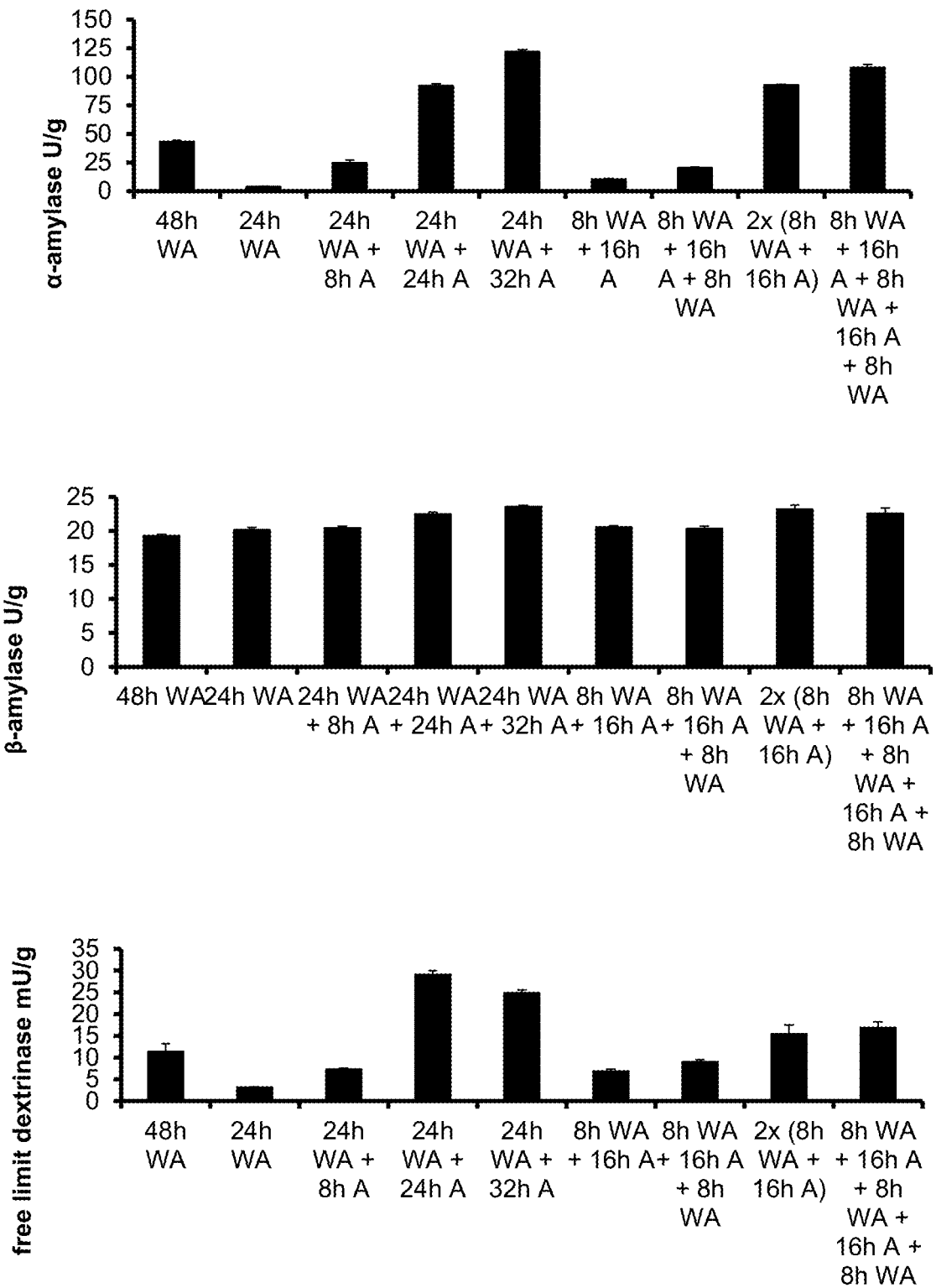
FIGS. 12A and 12B show α-amylase, β-amylase and limit dextrinase activity in barley germinated in aqueous solution under aeration (WA) with or without air-rest(s) (A) for the times indicated in the barley hull-less 01 (FIG. 12A) and in the barley hulled 02 (FIG. 12B).
Figure 12B:
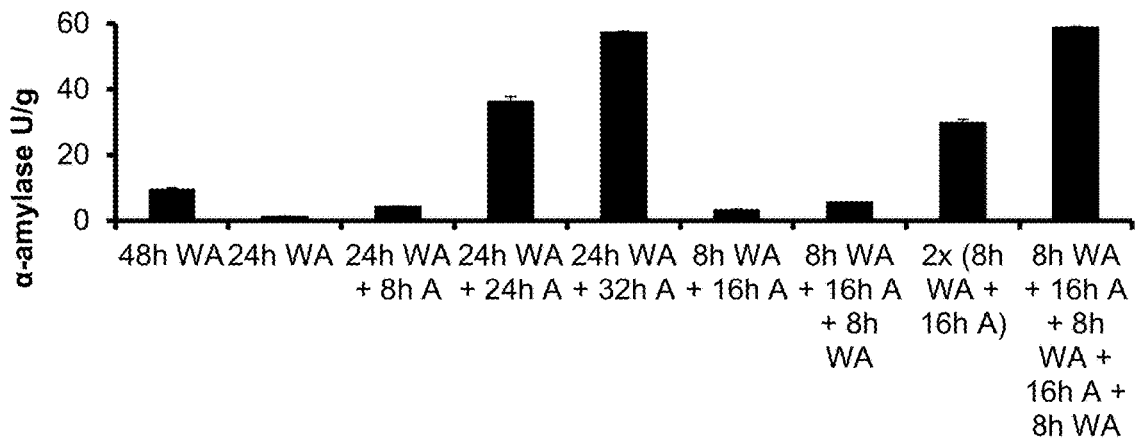
Figure 12B:
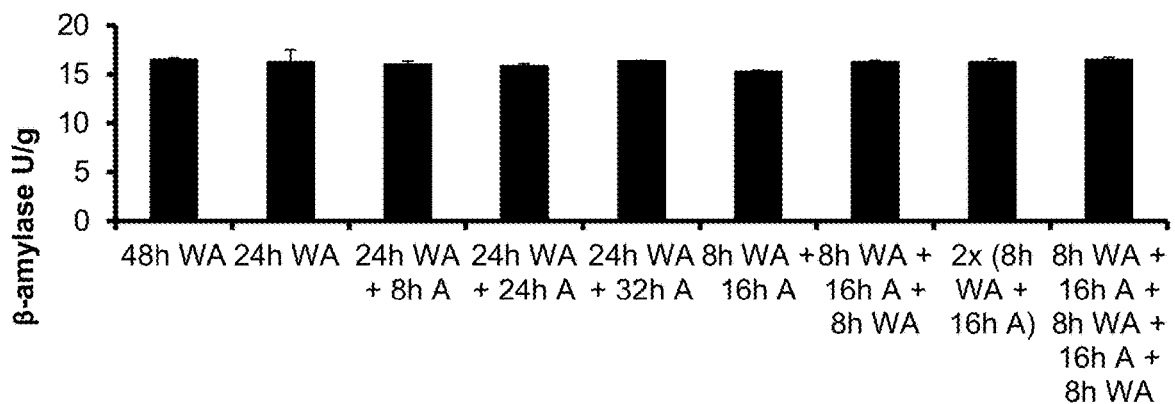
Figure 12B:
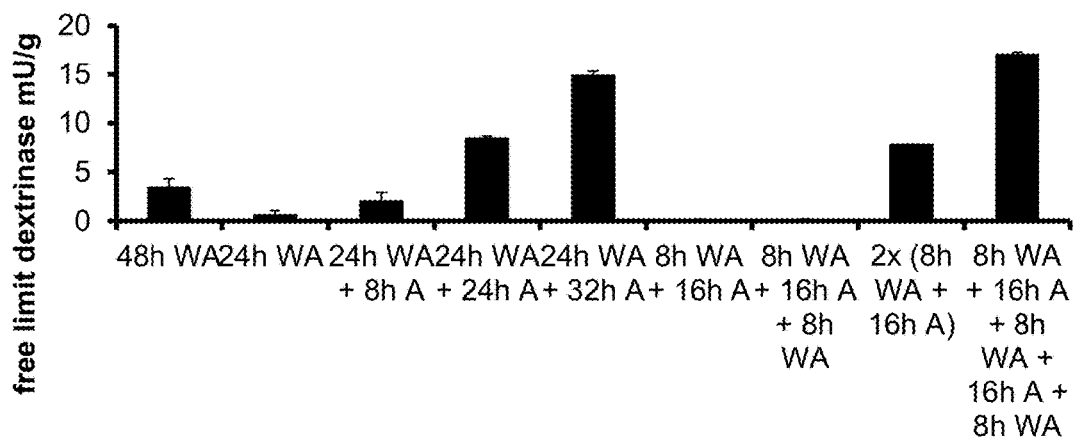

The cereal grains were incubated in WA or WA and A for the times indicated in FIGS. 12A-12B, and the results are shown in FIGS. 12A-12B. FIG. 12A shows the result for Hull-less 01 and FIG. 12B shows the result for Hulled 02. 24 h incubation in water under aeration followed by 24-32 h incubation without water, but still under aeration results in cereal grains with very high enzyme activities.

Example 10

Germinated barley was prepared essentially as described above in Example 1. More specifically, barley kernels of varieties Hull-less 01 and hulled 02 were sanitized with 0.1% hypochloran wash for 1 h, then steeped and germinated by incubation for 48 h in tap water containing 1000 nM GA and 0.01% antifoam agent. The incubation was performed at 25° C., and 90 l/h air was lead through the water from the bottom of the tank during the entire incubation. The germinated barley was freeze dried and weighed. The formed rootlets were removed using old Munich equipment and the germinated barley was weighed again. The difference in mass before and after removal of rootlets, were considered the mass of the rootlets. The weight of 4 different samples was determined, but only the 3 first are included, because the last sample contained dust. The results are shown in Table 9.

TABLE 9

| | Hull-less 01 | | | Hulled 02 | | |
|---|---|---|---|---|---|---|
| | Mass before (g) | Mass after (g) | Mass of rootlets (g) | Mass before (g) | Mass after (g) | Mass of rootlets (g) |
| 1 | 99.864 | 98.822 | 1.042 | 99.882 | 99.387 | 0.495 |
| 2 | 100.024 | 99.135 | 0.889 | 99.871 | 99.47 | 0.401 |
| 3 | 98.599 | 97.629 | 0.97 | 99.704 | 99.282 | 0.422 |
| average | | | 0.97 | | | 0.44 |
| stdev | | | 0.08 | | | 0.05 |

Barley kernels from the same batch of hull-less 01 and hulled 02 were also steeped and germinated for 96 h by standard methods. The germinated barley was freeze dried and weighed and the rootlets were removed using old Munich equipment. After rootlet removal the barley was weighed again and the difference in mass before and after removal of rootlets was considered the mass of the rootlets. The results are shown in Table 10.

TABLE 10

| | Hull-less 01 | | | Hulled 02 | | |
|---|---|---|---|---|---|---|
| | Mass before (g) | Mass after (g) | Mass of rootlets (g) | Mass before (g) | Mass after (g) | Mass of rootlets (g) |
| 1 | 95.167 | 87.026 | 8.141 | 96.343 | 89.867 | 6.476 |
| 2 | 95.281 | 87.046 | 8.235 | 95.602 | 89.102 | 6.5 |
| 3 | 95.318 | 87.113 | 8.205 | 95.338 | 89.072 | 6.266 |
| average | | | 8.19 | | | 6.41 |
| stdev | | | 0.05 | | | 0.13 |

Figure 13:
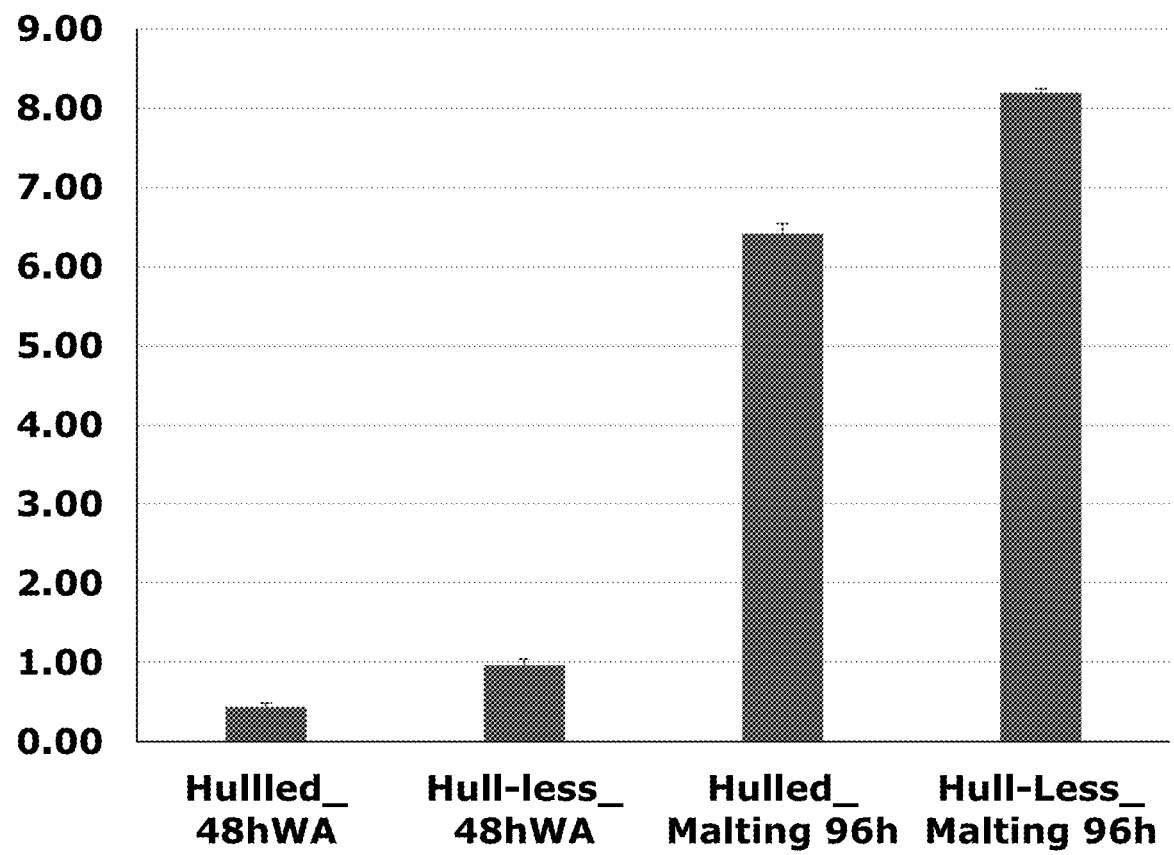
FIG. 13 shows the % weight loss after rootlet removal in both hulled and hull-less barley germinated by incubation in aqueous solution under aeration for 48 h (48 hWA) and barley germinated by standard steeping conditions for 96 h (Malting 96 h).

Table 11 shows a comparison between mass (in g) of rootlets of the barley germinated by the methods of the invention (48 h WA) and in barley steeped by conventional methods (Malting 96 h). It is evident that the barley germinated by the methods of the invention have significantly reduced rootlet formation. FIG. 13 shows the weight loss after rootlet removal in %.

TABLE 11

| Hullled 02_48 hWA | 0.44 | 0.05 |
| Hull-less 01_48 hWA | 0.97 | 0.08 |
| Hulled 02_Malting 96 h | 6.41 | 0.13 |
| Hull-Less 01_Malting 96 h | 8.19 | 0.05 |

Example 11

Nitrosamine NDMA is formed particular in roots during kilning of malt (Wainwright (1986) J Inst Brew 92 73-80).). As described above in Example 10, an advantage of the germinated cereal grains prepared by the methods of the invention is that they comprise less roots compared to ordinary green malt. NDMA content in contemporary malt is low, however it may be advantageous to reduce the levels even further.

NDMA content was analyzed in barley, in germinated barley grains prepared according to the methods of the invention (denoted "Malt 1a" in this Example) and in three industrially produced malts. The industrially produced malts had all been treated to remove rootlets by standard methods.

The barley-1, Malt-1a and Malt-1b were all prepared from the same batch of a hulled barley variety (Hulled 02), while the two other malt samples Malt-2 and Malt-3 both derive from other batches of barley. The Malt-1a was produced essentially as described above in Example 1. Thus barley kernels were sanitized with 0.1% hypochloran wash for 1 h, then steeped and germinated by incubation for 48 h in tap water containing 1000 nM GA and 0.01% antifoam agent. The incubation was performed at 25° C., and 90 l/h air was lead through the water from the bottom of the tank during the entire incubation.

Figure 14:
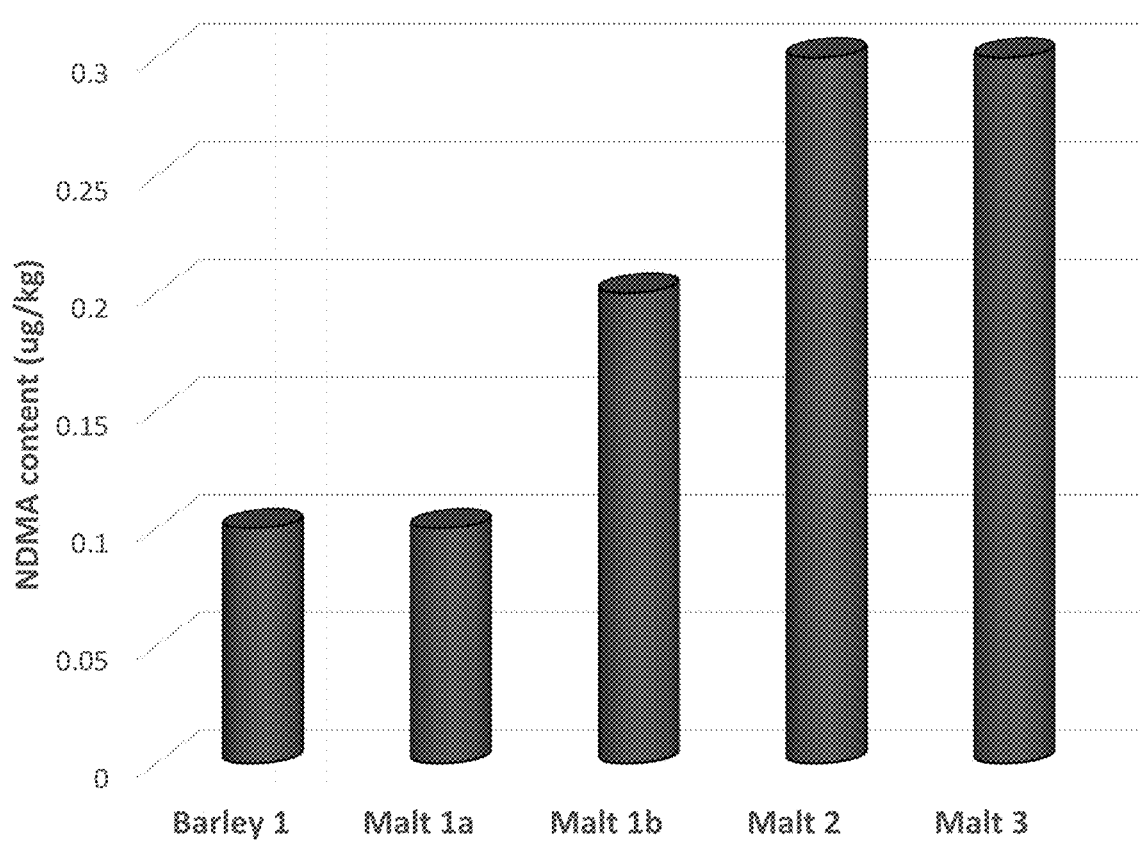
FIG. 14 shows the NDMA content in ungerminated barley, in barley germinated by the methods of the invention (Malt 1a), and in 3 different conventional malts (Malt 1b, Malt 2 and Malt 3).

The germinated barley was freeze dried before analyzing NDMA content by GC-MS. The results are shown in FIG. 14. The analysis clearly indicate that less NDMA is present in Malt-1a compared to malts produced by standard malting including kilning, even though the standard had been subjected to deculming.

Summary

The challenges of future water and energy shortages must be addressed in a socially, economically and environmentally responsible manner. In that respect, the present invention contributes to the long-term sustainability of beer production in terms of reduced water and energy usage. Through elimination of the kiln drying process, combined with the direct integration of the steeping and germination into the brewing process, application of the methods of the instant invention greatly reduce the input and running costs of beer manufacture.

The instant invention may contribute to lowering input costs and reducing the environmental pressure on the malting and brewing industries in numerous ways, including:

The steeping and germination processes that currently take several days to complete may be completed much faster The steeping and germination processes may be carried out in a single vessel at a single location The traditional air rest and second steep steps of the malting process may be eliminated The processes may reduce water consumption, for example by up to 40%

Expensive heating costs to kiln-dry the malt may be eliminated

Expensive transport costs to shift malt from the malthouse to the brewery may be eliminated Equipment and plant required to perform the methods of the invention may be compatible with existing equipment in brew houses and will therefore not require large new capital expenditure.

LITERATURE CITED

Bamforth C (2009) In: Beer: Tap into the art and science of brewing. Oxford University Press.

Briggs D E (1998) In: Malts and Malting. Blackie &, Professionals.

Burton R A, Wilson S M, Hrmova M, Harvey A J, Shirley N J, Medhurst A, Stone B A, Newbigin E J, Bacic A and Fincher G B (2006) Cellulose Synthase-like CsIF Genes Mediate the Synthesis of Cell Wall (1,3;1,4)-β-D-Glucans. Science 311, 1940-1942.

Burton R A, Jobling S A, Harvey A J, Shirley N J, Mather D E, Bacic A, Fincher G B (2008) The genetics and transcriptional profiles of the cellulose synthase-like HvCsIF gene family in barley (Hordeum vulgare L.). Plant Physiol., 146: 1821-1833.

Burton R A, Collins H M, Kibble N A J, Smith J A, Shirley N J, Jobling S A, Henderson M, Singh R R, Pettolino F, Wilson S M, Bird A R, Topping D L, Bacic A and Fincher G B (2011) Over-expression of specific HvCsIF cellulose synthase-like genes in transgenic barley increases the levels of cell wall (1,3;1,4)-β-D-glucans and alters their fine structure. Plant Biotechnol. J., 9: 117-135.

Fincher G B (2011) Biochemistry, Physiology and Genetics of Endosperm Mobilization in Germinated Barley Grain. In: Barley: Production, Improvements and Uses. Ed. Ullrich S E, Wiley-Blackwell, Chapter 14, pp 449-477.

Smith A M, Zeeman S. C, Smith S M (2005) Starch Degradation. Annual Review of Plant Biology 56: 73-98.

Taketa, S., Yuo, T., Tonooka, T., Tsumuraya, Y., Inagaki, Y., Haruyama, N., Larroque, O., and Jobling, S. A. (2011) Functional characterization of barley beta-glucan-less mutants demonstrates a unique role for CsIF6 in (1,3;1,4)-β-D-glucan biosynthesis, J. Exp. Bot. 63, 381-392.

The invention claimed is:

1. A method for producing an aqueous extract of a cereal, said method comprising the steps of:
   A. providing germinated grains of a cereal having a water content of at least 20% with the proviso that said cereal grains have not had a water content below 20% at any time subsequent to germination,
   wherein the cereal is a barley characterized by carrying a mutation in the gene encoding MMT, and
   wherein the entire time for steeping and germination to provide said germinated grains did not exceed 72 hours (h), and
   wherein the germinated grains have been prepared by steeping and germination comprising incubating said grains in an aqueous solution while 02 is passed through said aqueous solution;
   B. finely dividing said germinated grains, while said germinated grains have a water content of at least 20%; and
   C. preparing an aqueous extract of said finely divided germinated grains, thereby producing an aqueous extract of the cereal.

2. The method according to claim 1, wherein the germinated grains have an α-amylase activity of at least 4 U/g cereal grain on a dry weight basis.

3. The method according to claim 1, wherein the germinated grains contain at the most 4 gram (g) rootlets (dry matter) per 100 g germinated cereal grains (dry matter).

4. The method according to claim 1, wherein the cereal is a barley characterized by carrying a mutation in the gene encoding LOX-1 and carrying a mutation in the gene encoding MMT.

5. The method according to claim 1, wherein the cereal is a barley characterized by one or more of the following:
   A. carrying a mutation in the gene encoding a B-glucan synthase
   B. carrying a mutation in the gene encoding LOX-1
   C. carrying a mutation in the gene encoding LOX-2; and
   D. carrying a mutation in the gene encoding DELLA.

6. The method according to claim 1, wherein the method further comprises the steps of:
   a. providing grains of a cereal;
   b. subjecting the cereal grains to steeping and germination thereby obtaining germinated grains, wherein said steeping and germination comprises incubating said grains in an aqueous solution until the grains have a water content of at least 30%, wherein at least 2 L $O_2$ per kg dry weight cereal grains is passed through said aqueous solution per h; and at least one step of air-rest, wherein said cereal grains are incubated in air; and
   wherein said cereal grains do not have a water content below 20% at any time between the steeping and germination and the step of finely dividing said germinated grains.

7. The method according to claim 6, wherein the steeping and germination comprises the steps of
   a) incubating said grains in said aqueous solution, wherein at least 2 L $O_2$ per kg dry weight cereal grains is passed through said aqueous solution per h;
   b) air-rest, wherein said cereal grains are incubated in air;
   c) incubating said grains in said aqueous solution, wherein at least 2 L $O_2$ per kg dry weight cereal grains is passed through said aqueous solution per h; and
   d) air-rest, wherein said cereal grains are incubated in air.

8. The method according to claim 6, wherein the air-rest is in the absence of aqueous solution.

9. The method according to claim 1, wherein the step of incubating said grains in an aqueous solution under aeration is performed in the range of 16 to 30 h.

10. The method according to claim 7, wherein the step of incubating said grains in an aqueous solution under aeration is performed in the range of 20 to 30 h.

11. The method according to claim 7, wherein the step of incubating said cereal grains in air is performed in the range of 18 to 50 h.

12. The method according to claim 7, wherein the step of incubating said cereal grains in air is performed in the range of 18 to 38 h.

13. The method according to claim 1, wherein the entire time for steeping and germination does not exceed 54 h.

14. The method according to claim 1, wherein the method is performed in one or more apparatuses suitable for performing the method.

15. The method according to claim 1, wherein said $O_2$ is contained in a gas mixture, wherein the gas mixture is atmospheric air.

16. A method for producing a beverage, said method comprising the steps of:
   i. preparing an aqueous extract by the method according to claim 1; and
   ii. processing said extract into a beverage.

17. The method according to claim 16, wherein step ii comprises the steps of:
   a. heating said aqueous extract optionally in the presence of hops or hops extract;
   b. cooling the aqueous extract; and
   c. fermenting said aqueous extract with yeast, thereby producing a fermented beverage.

18. The method according to claim 16, wherein the beverage is lager beer.

19. The method according to claim 7, wherein the step of incubating said grains in an aqueous solution under aeration is performed in the range 22 to 26 h.

20. The method according to claim 7, wherein the step of incubating said cereal grains in air is performed in the range of 22 to 35 h.

* * * * *